(12) United States Patent
Tecot et al.

(10) Patent No.: US 7,836,473 B2
(45) Date of Patent: Nov. 16, 2010

(54) INTERFACE STRATEGIES FOR CREATING AND INVOKING MARKS

(75) Inventors: Edward M. Tecot, Sunnyvale, CA (US); Shannon C. Hegg, Mountain View, CA (US); Laurie J. Vertelney, Palo Alto, CA (US); Michael J. Darnell, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 1134 days.

(21) Appl. No.: 10/779,450

(22) Filed: Feb. 12, 2004

(65) Prior Publication Data

US 2005/0094031 A1 May 5, 2005

Related U.S. Application Data

(63) Continuation-in-part of application No. 10/698,349, filed on Oct. 31, 2003.

(51) Int. Cl.
G06F 3/00 (2006.01)
G06F 13/00 (2006.01)
H04N 5/91 (2006.01)
H04N 7/00 (2006.01)
H04N 5/00 (2006.01)

(52) U.S. Cl. .............................. 725/78; 725/38; 386/95; 386/125; 386/46

(58) Field of Classification Search .................... 725/52
See application file for complete search history.

(56) References Cited

U.S. PATENT DOCUMENTS 5,675,390 A * 10/1997 Schindler et al. ............ 715/717
5,805,235 A *  9/1998 Bedard ......................... 725/38
5,884,056 A     3/1999 Steele
6,064,380 A     5/2000 Swenson et al.
6,166,735 A    12/2000 Dom et al.

(Continued)

FOREIGN PATENT DOCUMENTS

CN          1363184          7/2002

(Continued)

OTHER PUBLICATIONS

Gordon Bell and Jim Gemmell, "A Call for the Home Media Network," Communications of the ACM, vol. 45, No. 7, Jul. 2002, pp. 71-75.

Primary Examiner—Andrew Y Koenig
Assistant Examiner—Mark D Featherstone
(74) Attorney, Agent, or Firm—Lee & Hayes, PLLC

(57) ABSTRACT

Strategies are described for adding a mark to media content at a source location in response to the activation of a marking mechanism, and then resuming the presentation of the media content at a second location based on the mark. The source location may be the same as the destination location, or the source location may differ from the destination location. In the latter case, the source location can correspond to a first room in a home that provides a first media processing mechanism, and the destination location can correspond to a second room in the home that provides a second media processing mechanism. The marking mechanism can correspond to a mark button provided by a remote control. Various user interface displays facilitate the adding of the mark and the resuming of the presentation, including various timelines displays, mark panel displays, thumbnail displays, etc.

17 Claims, 11 Drawing Sheets

U.S. PATENT DOCUMENTS

| | | | |
|---|---|---|---|
| 6,320,591 B1 * | 11/2001 | Griencewic | 345/582 |
| 6,460,038 B1 * | 10/2002 | Khan et al. | 707/10 |
| 6,611,654 B1 | 8/2003 | Shteyn | |
| 6,642,939 B1 * | 11/2003 | Vallone et al. | 715/721 |
| 6,647,548 B1 * | 11/2003 | Lu et al. | 725/20 |
| 7,143,353 B2 | 11/2006 | McGee et al. | |
| 7,289,812 B1 | 10/2007 | Roberts et al. | |
| 7,346,917 B2 * | 3/2008 | Gatto et al. | 725/5 |
| 7,451,467 B2 * | 11/2008 | Carver et al. | 725/34 |
| 2002/0012526 A1 | 1/2002 | Sai et al. | |
| 2002/0059621 A1 | 5/2002 | Thomas et al. | |
| 2003/0016951 A1 * | 1/2003 | Jakel et al. | 386/125 |
| 2003/0126599 A1 * | 7/2003 | Novak et al. | 725/32 |
| 2003/0206719 A1 | 11/2003 | Bumgardner et al. | |
| 2004/0001107 A1 * | 1/2004 | Russon | 345/838 |
| 2005/0022132 A1 * | 1/2005 | Herzberg et al. | 715/759 |
| 2005/0166258 A1 * | 7/2005 | Vasilevsky et al. | 725/138 |

FOREIGN PATENT DOCUMENTS

| | | |
|---|---|---|
| WO | WO0004626(A2) | 1/2000 |
| WO | WO0058967(A1) | 10/2000 |
| WO | WO03061283(A1) | 7/2003 |
| WO | WO03067594(A1) | 8/2003 |

\* cited by examiner

INTERFACE STRATEGIES FOR CREATING AND INVOKING MARKS

CROSS-REFERENCE TO RELATED APPLICATIONS

The present application is a continuation-in-part of co-pending U.S. patent application Ser. No. 10/698,349, entitled "Multimedia Presentation Resumption within an Environment of Multiple Presentation Systems," filed on Oct. 31, 2003, which is incorporated herein by reference in its entirety.

TECHNICAL FIELD

This invention relates to strategies for presenting information to users, and, in a more particular implementation, to interface strategies for associating a mark with information and for presenting the information based on the mark in the context of a multi-location presentation environment.

BACKGROUND

Home networking and multi-device presentation systems are becoming an increasingly popular mechanism for presenting media content within homes or other local settings. In a typical multi-device scenario, a home may include multiple interconnected presentation devices in different rooms of the home. In one possible configuration, a media content program being received by a hub presentation device from an external or local source can be transferred to one or more other presentation devices throughout the home. This provision gives the users in the home flexibility in their consumption of the media content program. For instance, a user can transfer a media content program from the hub presentation device to a room (such as a bedroom or den) in which the user prefers to consume this media content program.

The above-referenced commonly assigned patent application describes a system for greatly enhancing the presentation options available to users in an environment that includes multiple presentation devices. According to one of the exemplary techniques described in that application, a user can pause a media content presentation at a first presentation device and then resume the presentation at a second presentation device. For instance, in one scenario, the user can pause a live broadcast of a media content program that is being presented at the presentation device located in the living room of the home. The user can then move to her bedroom where she is allowed to resume the media content program on the second presentation device at the exact point where it was paused. This resumption mechanism is of great advantage, as it allows the user to "consume" media content programs throughout the home on different presentation devices without missing any media content and without having to perform burdensome re-queuing of the media content.

Nevertheless, there remains room for improvement regarding the above-described media presentation system. Namely, for instance, the commercial success of media presentation technologies is strongly dependent on the techniques that these technologies use to interact with users—that is, the strategies that these technologies use to present information to users and receive input from the users. It is desirable to increase the utility of such user interfaces by providing an interface design with sufficiently rich functionality. But it is also desirable to provide sufficiently user-friendly interfaces, which may place constraints on the complexity of the user interfaces.

Accordingly, there is an exemplary need for improved interface strategies for allowing users to transfer media content from one presentation device to another (or for allowing users to mark the media content at a presentation device and then later resume the presentation of the media content on the same presentation device).

SUMMARY

According to one exemplary implementation, a method is described for presenting information. The method includes: (a) adding a mark, that is associated with the information, at a source location by activating a marking mechanism; and (b) presenting the information at a destination location based on the mark added at the source location. At least one of steps (a) and (b) involves displaying a visual indicator of the mark at a display position that is related to a time at which the mark was associated with the information.

According to another exemplary feature, the marking mechanism comprises a mark button provided on a remote control which interacts with a processing mechanism that implements the adding.

According to another exemplary feature, the displaying involves presenting the visual indicator of the mark at a display position along a timeline, where the position conveys a juncture at which the mark occurs within the information.

According to another exemplary feature, the displaying involves presenting multiple visual indicators of multiple respective marks at multiple respective display positions along the timeline, where the multiple positions convey respective junctures at which the multiple marks occur within the information.

According to another exemplary feature, the visual indicator of the mark comprises a thumbnail image corresponding to a part of the information associated with the mark, and the displaying comprises presenting the thumbnail image in positional relationship to at least one other thumbnail image associated with another mark, wherein the positional relationship is based on the respective times associated with the creation of the marks.

According to another exemplary implementation, another method is described herein for presenting information that includes: (a) receiving instructions generated in response to the activation of a marking mechanism during the display of a first program; (b) displaying a mark panel display in response to the instructions; and (c) receiving a user's input via the mark panel display to perform at least one of: creating a new mark in the first program; and invoking a preexisting mark in a second program.

Additional implementations and features will be described in the following.

Figure 1:
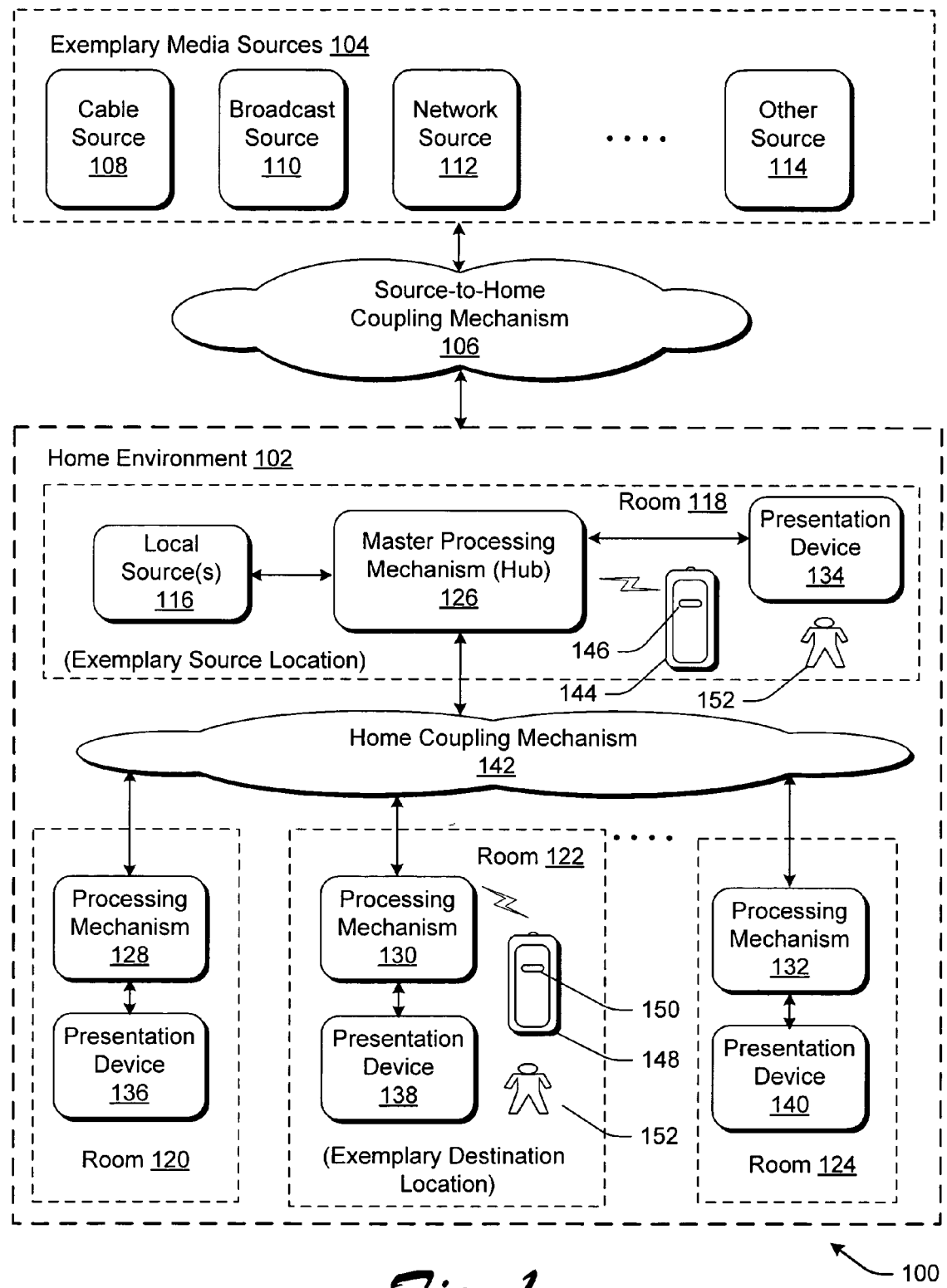
FIG. 1 shows an exemplary system for implementing a media presentation architecture described herein.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The strategies described herein pertain to adding marks to information and resuming the presentation of the information based on the marks. The term "information" encompasses any kind of resource that can be consumed by a user, such as audio resources (e.g., music, etc.), still picture resources (e.g., digital photographs, etc.), moving picture resources (e.g., broadcast television resources, movies, etc.), computer programs (e.g., games, etc.), markup language resources (e.g., hypertext markup language resources received via a wide area packet network), and so on. The information can be analog or digital or a combination of analog and digital. The information can be received in one format and then converted into another format (such as received in analog format and then converted into digital format).

To facilitate discussion, the marking functionality will be described in the exemplary context of media content programs that contain media content. Such media content programs are most commonly associated with any kind of audio and/or video programs. The media content programs can also include (or can omit) interactive content. Exemplary types of media content programs can include television programs, movies, music, computer games, digital pictures (such as a digital slide show of pictures), etc. The media content programs can be presented on media presentation devices commonly found in the home (such as televisions, stereo systems, personal computers, etc.). The media content programs can be in analog format, digital format, a combination or analog and digital formats, and so on. However, again, the strategies described here have application to any kind of resources that can be presented on any kind of digital and/or analog rendering apparatus.

Generally, any of the functions described herein can be implemented using software, firmware (e.g., fixed logic circuitry), manual processing, or a combination of these implementations. The term "logic" or "module" as used herein generally represents software, firmware, or a combination of software and firmware. For instance, in the case of a software implementation, the term "logic" or "module" represents program code that performs specified tasks when executed on a processing device or devices (e.g., CPU or CPUs). The program code can be stored in one or more computer readable memory devices. More generally, the illustrated separation of logic and modules into distinct units may reflect an actual physical grouping and allocation of such software and/or hardware, or can correspond to a conceptual allocation of different tasks performed by a single software program and/or hardware unit. The illustrated logic and modules can be located at a single site (e.g., as implemented by a processing device), or can be distributed over plural locations.

Further, to facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

Finally, a number of examples will be presented in this disclosure in the alternative (e.g., case A or case B). In addition, this disclosure encompasses those cases which combine alternatives in a single implementation (e.g., case A and case B), even though this disclosure may not expressly mention these conjunctive cases in every instance.

This disclosure includes: Section A which describes an exemplary architecture for implementing the resumption technique described herein; Section B which describes exemplary procedures for performing the resumption technique; and Section C which describes exemplary user interface (UI) presentations (or "pages") for assisting a user in interacting with the architecture described in Section A.

A. Exemplary Architecture for Implementing Marking and Resumption Functionality

A.1. Exemplary System

FIG. 1 shows an exemplary system 100 for implementing the resumption techniques described herein. Broadly, the system 100 includes a home environment 102 that receives media content programs from media sources 104 via a coupling mechanism 106. The media sources 104 can include one or more kinds of sources. For instance, the media sources 104 can comprise a cable source 108 that transmits media content programs via hardwired lines (e.g., coaxial cables) to the home environment 102. Alternatively, or in addition, the media sources 104 can comprise a broadcast source 110 that transmits media content programs via conventional wireless transmission from a local antenna to the home environment 102. Alternatively, or in addition, the media sources 104 can comprise various network sources 112 (such as sources coupled to a packet network such as the Internet) that transmit media content programs to the home environment 102. Still further possible sources can be used to provide media content programs, as indicated by the generically labeled "other source" module 114 in FIG. 1. In general, any of the media sources (108-114) can include any kind of infrastructure, such as various equipment for storing media content programs, various equipment for processing media content programs, various equipment for transmitting the media content programs, and so on. In one implementation, the media sources 104 can be configured to provide a one-way information conduit from the media sources 104 to the home environment 102. In another implementation, the media sources 104 can be configured to provide a two-way information conduit that also accommodates information transfer from the home environment 102 to the media sources 104; in this case, such transfer can be accomplished through the same coupling mechanism used to transfer information from the media sources 104 to the home environment 102, or via a supplemental coupling mechanism.

Still alternatively, instead of the external media sources 104, or in addition to the external media sources 104, the home environment 102 may receive media content programs from a source within the confines of the home environment 102. One such exemplary local source is illustrated in FIG. 1 as local source 116. This local source 116 can represent any kind of storage media, such as any kind of silicon memory media, any kind of magnetic memory media, any kind of optical storage media, and so on. For instance, local sources 116 can include digital video disks (DVDs), compact disks (CDs), various types of magnetic disk or tape storage media, and so on. The local source 116 may also represent various devices for storing and retrieving the media content, such as various jukebox devices, various computing devices, and so on.

In general, various commercial and contractual circumstances may govern the dissemination of media content programs. In one circumstance, the users in the home environment 102 are permitted to receive the resources from the media sources (104-116) free of charge. For example, the users in the home environment 102 can receive resources from a conventional broadcast source via wireless transmission from a local antenna or satellite. In another circumstance, the users in the home environment 102 must pay a periodic or one-time fee to receive the resources from the media sources (104-116). For instance, the users in the home environment 102 can receive resources from a conventional cable source via cable transmission by paying a monthly fee, or can receive resources from a pay-for-view site which allows the users to select and pay for individual resources. Any media source can offer resources on a fixed schedule or at times requested by the user, such as in the case of video on-demand (VOD) resources. Still other implementations and contractual permutations may govern the dissemination of media content programs.

A source-to-home coupling mechanism 106 can represent any kind of information conduit, or any combination of information conduits. In one case, this coupling mechanism 106 can represent a conventional cable coupling mechanism, local broadcast coupling mechanism, a satellite coupling mechanism, a digital network coupling mechanism, or other kind of coupling mechanism or combination thereof. In the case of a digital network coupling mechanism, the network can be implemented as a wide area network (WAN) that transmits information in packets (such as the Internet), an intranet, a local area network (LAN), and so on. The source-to-home coupling mechanism 106 can generally include any combination of hardwired links and wireless links, antennae, routers, gateways, etc.

The home environment 102 can represent a conventional residential home. Alternatively, the home environment 102 can represent any other kind of building or local setting, such as an apartment building, a school, an office building, a government building, etc. Instead of a single building, the home environment 102 can pertain to a collection of buildings, e.g., a campus or other defined geographic area. In any case, the home environment 102 can include multiple rooms, compartments, or other areas, such as room 118, room 120, room 122, and room 124. For instance, room 118 can correspond to a central media center in the home environment 102, such as a family room having an entertainment center located thereat. In one entirely exemplary case, room 120 may correspond to a study, room 122 may correspond to a bedroom, and room 124 may correspond to another bedroom.

Different processing mechanisms (126-132) and presentation devices (134-140) are located in the respective rooms (118-124). That is, processing mechanism 126 and presentation device 134 are located in room 118, processing mechanism 128 and presentation device 136 are located in room 120, processing mechanism 130 and presentation device 138 are located in room 122, and processing mechanism 132 and presentation device 140 are located in room 124. In general, a processing mechanism can correspond to any equipment used to process media content programs for presentation at a presentation device. An exemplary processing mechanism can correspond to a set-top box or may correspond to software and/or hardware functionality integrated into the associated presentation device itself. Alternatively, the processing mechanism can correspond to any kind of computing device (such as a personal computer) running any kind of software, a digital video playback device (DVD), a personal video recording device (PVR), and so on. An exemplary presentation device can correspond to a television, an audio presentation device (e.g., a stereo system), a computer monitor, and so on. Although not shown, any room (118-124) can include more than one processing mechanism and associated presentation device.

In one exemplary implementation, a home coupling mechanism 142 couples the processing mechanisms (126-132) and presentation devices (134-140) together. The home coupling mechanism 142 can be implemented as part of a wide area network using the Internet Protocol (IP), an intranet, a local area network (LAN), an Ethernet, a Universal Plug and Play (UPnP) protocol network, a point-to-point coupling technique, or other type of coupling strategy. The home coupling mechanism 142 can be physically implemented using any kind of hardwired lines and/or wireless links (e.g., radio, infrared, etc.). The home coupling mechanism 142 and the source-home-coupling mechanism 106 can also share various coupling resources, or, indeed, can represent the same networks. In another implementation, the home coupling mechanism 126 is merely conceptual, where the actual transfer of media resources from one presentation mechanism to another can be performed by manual transport of media, such as disks, video tape, etc. Generally, the home coupling mechanism 142 can be used to transmit control information between processing mechanisms (126-132) to coordinate the transfer of programs between processing mechanisms; alternatively, or in addition, the home coupling mechanism 142 can be configured to permit actual transfer of media content between processing mechanisms (126-132).

The system 100 can be implemented such that processing mechanism 126 acts as a central server or hub which services the requests of other processing mechanisms (e.g., processing mechanism 128-132), which act as clients. In this case, the master processing mechanism 126 can provide the primary coupling between media sources 104 and the home environment 102. To serve in this capacity, the master processing mechanism 126 can include various functionality that is not provided in the other processing mechanisms (128-132). In another case, any of the processing mechanisms (126-132) can function as a server to other processing mechanisms, in which case all of the processing mechanisms (126-132) can include identical functionality. Still other architectures can be used to govern the interaction between processing mechanisms (126-132). In general, the system 100 may assign one of the processing mechanisms (126-132) the primary role of interacting with the media sources (104, 116), or the system 100 may permit each processing mechanism (126-132) to directly interact with the media sources (104, 116).

Finally, the users can interact with the processing mechanisms (126-132) using one or more input devices. For instance, FIG. 1 shows the exemplary use of a remote control 144 to interact with processing mechanism 126 and associated presentation device 134, and the use of a remote control 148 to interact with processing mechanism 130 and associated presentation device 138. The remote controls (144, 148) can interact with processing mechanisms (126-132) via a conventional communication technique, such as infrared signaling. One remote control can be used to interact with multiple processing mechanisms, or particular remote controls can be used to interact with respective processing mechanisms. The processing mechanisms (126-132) can alternatively, or in addition, provide other input devices for receiving user input, such as keyboards, keypads, joysticks, trackballs, etc. that are coupled to the processing mechanisms via hard line or are integrated with the processing mechanisms (126-132) themselves.

By way of broad overview, the system 100 shown in FIG. 1 allows a user to enter a mark using an input device (such as a remote control) while "consuming" particular media content programs at a particular presentation device in a particular room in the home environment 102. One way that a user can enter this mark is via a mark button provided on the input device, such as exemplary mark button 146 on remote control 144 and exemplary mark button 150 on remote control 148. Note that other keys used by these remote controls (144, 148) are omitted in FIG. 1 so as not to unduly complicate this figure. Upon pressing one of these mark buttons (146, 148) while a media content program is playing (or while the user is otherwise interacting with media content program), the associated presentation mechanism will record a mark that represents a position in the media content program. In the case of an audio and/or video content program, the mark represents a particular point in the stream of information provided by the program, such as a particular point in a song or a particular scene in a movie. In a computer program, the mark can represent a particular state among a plurality of possible states provided by the program (such as a particular stage within a particular game, etc.). The mark itself can include various information, such as the exact time and date when the mark was created, the relative position of the mark within the serial stream of information provided by the media content program, an indication of the user who created the mark, the room in which the mark was created, the processing mechanism used to create the mark, the processing mechanism or processing mechanisms that are permitted to later invoke the mark, the expiration time of the mark, or any other information associated with the mark. One or more of these information items can be omitted. In one implementation, the system 100 can store the mark as a component of the media content program to which it pertains (e.g., as data associated with or embedded in a particular video frame in the media content program). Alternatively, the system 100 can store the mark in a separate store (not shown), where the information associated with the mark conveys the correlation between the mark and the media content program to which it pertains. In any event, the system 100 can provide one or more user interface pages to assist the user in generating marks and for later reviewing the marks. Section C describes a series of such exemplary user interface pages.

After creating a mark in a media content program, the user who created the mark, or a different user, can resume the presentation of the media content program at the same processing mechanism that was used to create the mark, or the user can resume the media content program at a different processing mechanism. For instance, assume that a user 152 uses the remote control 144 to enter a mark while watching a particular media content program (e.g., while watching a television program or movie) in room 118 by actuating the mark button 146 at a particular juncture in the presentation of the media content program. This action prompts the processing mechanism 126 to record the mark and correlate it to a particular point in the media content program that is temporally associated with the actuation of the mark button 146. To facilitate discussion, room 118 can be referred to as a "source location," since it defines the geographic location where the user viewed a portion of the media content program and created the mark.

That same user 152 (or another user) can then invoke the mark to resume the presentation of the media content program. The user 152 can invoke the mark at the processing mechanism 126 used to create the mark, or at any other processing mechanism in the home environment 102. To provide a concrete example, assume, for instance, that the user 152 uses remote control 148 in room 122 to invoke the mark, causing the processing mechanism 130 to resume the presentation of the media content program starting from the position in the program associated with the mark. In another implementation (not shown), the user 152 can continue to watch the media content program in room 118 after the mark has been created. Simultaneously, if the media content program so permits, another user can go to room 122 and invoke the mark, prompting the processing mechanism 130 to resume the media content program starting at the point in time associated the mark. Thus, in this case, two users are simultaneously consuming the same media content program, but perhaps at different junctures in the program. The system permits still other application variations. In any event, in the scenario described above, the room 122 can be referred to as the "destination location," as it defines a location at which the media source program is resumed.

The system 100 can implement the transfer of media content programs from one processing mechanism to another processing mechanism using different kinds of techniques. In a pull architecture, media content originally present at processing mechanism 126 can be transferred to processing mechanism 130 at the time that the user 152 decides to invoke the mark in room 122. In a push architecture, media content originally presented at processing mechanism 126 can be transferred to processing mechanism 130 at the time that the user 152 creates the mark in room 118. This has the effect of pushing the required media content from the processing mechanism 126 to the processing mechanism 130. Still other media content transfer mechanisms can be used to transfer media content programs from one processing mechanism to another. In general, the transfer of media content can refer to the actual transfer of media content information, or may refer to the transfer of control and configuration information which allows another processing mechanism to resume a media content program.

The specific behavior of the media content transfer between processing mechanisms can also vary depending on the type of media content programs being transferred. One category of media content programs is so-called live content, where the receiving processing mechanism receives the media content under conditions dictated by the transmitting media source (e.g., at a fixed media streaming schedule defined by the transmitting media source). Another category of media content programs is so-called recorded content, where the receiving processing mechanism has some control over the playback of the media content, that is, so that the playback is not dictated by an agent outside the control of the receiving processing mechanism. Another category of media content programs is so-called video on-demand (VOD) content, where the receiving processing mechanism can access media resources on-demand, but otherwise may not have the kind of freedom in playback permitted by the recorded content category. The behavior also depends on variations of the above-described basic content types. Further information regarding different media content types and their relevance to the behavior of the media content transfer functionality will be provided in Sections B and C below.

In the case of a live broadcast presentation, the system 100 can implement the media content transfer functionality by using different techniques. In general, the reception of a live broadcast may rely on one or more tuners to receive and demodulate information received from a media source (or sources). One technique for transferring media content is referred to as "tuner swapping," and another technique is referred to as "tuner sharing." In either case, the system 100 tracks the state of all live media content being consumed by each processing mechanism (126-132) in the system 100 (e.g., corresponding to states of paused, playing, delayed, etc.).

In the tuner swapping technique, the system 100 exchanges the state regarding the playback of media content between processing mechanism 126 and processing mechanism 130 (that is, with reference to the exemplary source/destination example developed above). To implement tuner swapping, the processing mechanism 126 (the source location) can "give up" its tuner to the processing mechanism 130 (the destination location). As a result, the processing mechanism 130 will have access to the media content pause buffer associated with a particular tuner, but the processing mechanism 126 will not have such access.

In tuner sharing, the system 100 allows both processing mechanism 126 and processing mechanism 130 to play back the same shared content while keeping independent states. To implement tuner sharing, the processing mechanism 130 and the processing mechanism 126 can be configured to share the same tuner and associated pause buffer.

Regardless of how the transfer of media content programs is implemented, the processing mechanisms (126-132) can provide various user interface pages that notify the user 152 of the presence of marks in media content programs, the positions of these marks within the media content programs, and other salient information regarding the marks. The user 152 can use these user interface pages to activate the marks and thus resume the media content programs at the respective junctures in the media content programs where the marks were made. Section C (below) provides additional information regarding exemplary user interface pages that can be used to view and activate marks.

In the examples provided above, each of the processing mechanisms (126-132) includes local processing functionality for interacting with users. But, in another implementation, the system 100 can provide a central server which provides functionality that can be shared among plurality processing mechanism which operate as clients.

A.2. Exemplary Processing Mechanism

Figure 2:
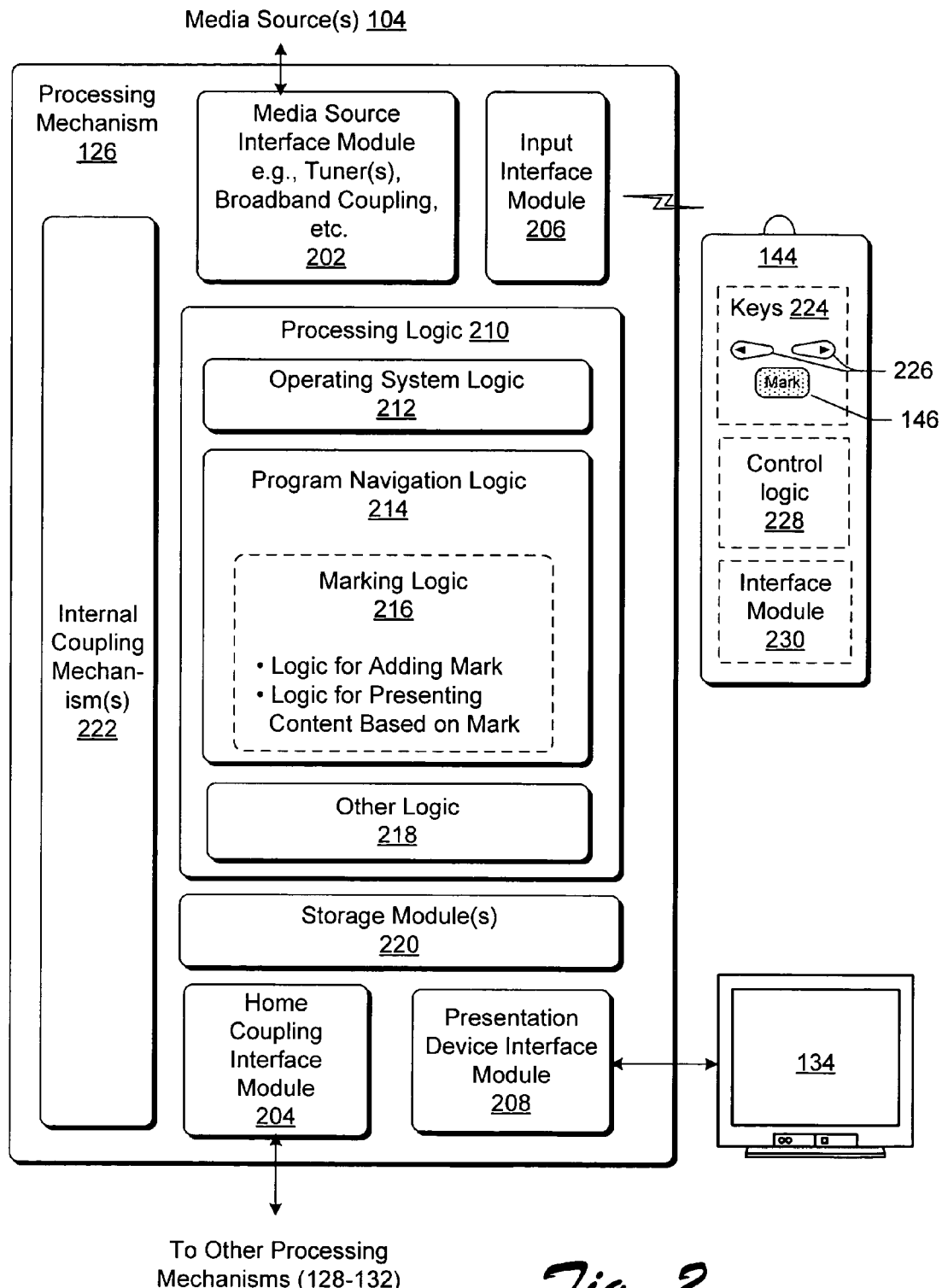
FIG. 2 shows an exemplary processing mechanism used in the system of FIG. 1.

FIG. 2 is a more detailed illustration of an exemplary architecture of the processing mechanism 126 at the source location (e.g., in room 118). As mentioned in FIG. 1, this processing mechanism 126 interacts with the media sources 104 via the source-to-home coupling mechanism 106. This processing mechanism 126 also interacts with other processing mechanisms (128-132) via the home coupling mechanism 142. The other processing mechanisms (128-132) can have an identical construction to processing mechanism 126 at the source location. Alternatively, the other processing mechanisms (128-132) can omit one or more modules used in the presentation mechanism 126 shown in FIG. 2, or can add additional modules that are not present in the processing mechanism 126 shown in FIG. 2.

The processing mechanism 126 is depicted as separate from its associated presentation device 134 (which, in this case, corresponds to a conventional television presentation device). In this implementation, the processing mechanism 126 can be provided as a set-top box which couples to the presentation device 134 via hardwired or wireless link(s). In an alternative implementation, the processing mechanism 126 can be formed as an integral module of the presentation device 134, such as a circuit board or other component within the presentation device 134.

The processing mechanism 126 is illustrated as receiving input from the user 152 via the remote control 144. Alternatively, or in addition, the processing device 126 can receive input from other input devices, such as a keyboard, joystick, trackball, touch sensitive screen, and so on.

The processing mechanism 126 itself is shown as including a number of modules. Each of these modules can be implemented in software, hardware, or a combination of software and hardware. To achieve a software implementation, the processing mechanism 126 can provide volatile and/or non-volatile memory (not shown) for storing machine readable code and one or more processors (e.g., CPUs) (not shown) for implementing this code. Alternatively, hardware implementations can rely, in whole or in part, on application-specific logic circuitry for providing various functions to be described below.

To begin with, the processing mechanism 126 includes a media source interface module 202 for receiving media content programs from the media sources 104. The media interface module 202 is a general conceptual container that can represent any software or hardware for receiving media content programs depending on the techniques used to transfer the media content programs. For conventional broadcast sources, the media source interface module 202 can include one or more tuners for tuning the processing mechanism 126 to channels used by the media sources 104 to transmit media content programs (e.g., television programs) to the home environment 102, and for demodulating the received media content programs. For network sources, the media source interface module 202 can include various kinds of modems or broadband couplings for decoding and processing media content programs received over hardwired and/or wireless network links (such as over the Internet). In the case where two-way communication is permitted, the media source interface module 202 can also include functionality configured to transmit information to the media sources 104. The above-described examples are merely representative of a wide range of coupling functionality that can be provided in the media source interface module 202.

A home coupling interface module 204 includes functionality for connecting the processing mechanism 126 to the other processing mechanisms (128-132) via the home coupling mechanism 142. This home coupling interface module 204 permits two-way communication, that is, by allowing the processing mechanism 126 to transmit information to other processing mechanisms (128-132), and by allowing the processing mechanism 126 to receive information from the other processing mechanisms (128-132). The home coupling interface module 204 can be implemented in different ways depending on the type of home coupling mechanism 142 being employed in a particular system 100; generally, the home coupling interface module 204 can include various kinds of modems, point-to-point interface logic, decoding functionality, etc. Further, in another implementation, various resources in the media source interface module 202 can be shared with the home coupling interface module 204, especially where the source-to-home coupling mechanism 106 and the home coupling mechanism 142 share network resources.

The processing mechanism 126 can also include an input interface module 206 configured to interact with an input device, such as the remote control 144, a keyboard, a trackball, a joystick, a touch sensitive screen, and so on. In the illustrated implementation where the processing mechanism 126 interacts with the remote control 144, the input interface 206 can include functionality configured to convert infrared signals received from the remote control 144 into digital signals that can be processed by the processing mechanism 126.

The processing mechanism 126 also includes a presentation device interface module 208 for interfacing with the presentation device 134. In the implementation illustrated in FIG. 2, the presentation device interface module 208 can include functionality for formatting video and audio signals for presentation at the presentation device 134 (which, in this case, is a conventional television apparatus).

The core of the functionality provided by the processing mechanism 126 is implemented by the processing logic 210. The processing logic 210 can be implemented by hardwired logic circuitry, by one or more processing devices (CPUs) running machine readable code, or by a combination of hardware and software. To facilitate discussion, FIG. 2 depicts the processing logic 210 as including a plurality of logic modules, which may correspond to discrete logic circuitry units or sections of computer code that implement different functions. Of these logic modules, operating system logic 212 handles various background tasks associated with the operation of the processing mechanism 126, such as the transfer of information between different components of the processing mechanism 126.

Program navigation logic 214 generally handles all tasks associated with presenting media content programs to users at respective presentation devices. Such tasks can include, but are not limited to, switching between different media content programs (e.g., by "switching" channels in a conventional TV environment), presenting electronic program guide (EPG) information that identifies available media content programs and the schedule at which these programs can be presented, presenting VOD program information that identifies available programs that can be accessed by users on an on-demand basis, starting a particular media content program, stopping or pausing a particular media content program, transferring a media content program from one processing mechanism to another, and so on.

Marking logic 216 within the program navigation logic 214 specifically provides the functionality that handles various tasks associated with the processing of marks. More specifically, this marking logic 216 can be conceptualized as providing two main functions. One function entails the creation of marks at a source location. Another function entails the invocation of marks at a destination location, thereby resuming the media content programs associated with the marks. To accomplish these objectives, the marking logic 216 is configured to generate and display various user interface pages that allow the users to create marks, examine the presence of marks in programs, and resume the presentation of programs based on marks respectively contained therein.

The processing logic 210 can also handle a variety of other functions not directly relevant to the marking behavior featured in this description. FIG. 2 generically labels such other functionality as "other logic" 218.

The processing mechanism 126 can also include one or more storage modules 220. These storage modules can include various types of volatile and non-volatile memory. Exemplary storage modules can be dedicated to storing program code. Other exemplary storage modules can be dedicated to implementing pause buffers used to record media content in various circumstances, such as when users activate the pause or mark buttons on their respective remote controls. The storage modules 220 can also provide various floppy disk drives, hard disk drives, optical disk drives, etc. for storing information on a more permanent basis.

Finally, the processing mechanism 126 can include one or more internal coupling mechanisms 222 for coupling its various modules together. These coupling mechanisms 222 can represent various buses, various point-to-point coupling connections, and so on.

FIG. 2 also shows a simplified depiction of the remote control 144 used to interact with the processing mechanism 126. The remote control 144 can include a collection of keys 224 that allow the user 152 to enter information. For instance, the remote control 144 can include conventional channel up/down keys 226 that allow the user 152 to sequence through channels in a serial fashion in a forward or reverse direction. The keys 226 can also include the mark button 146. The user 152 can press the mark button 146 at a particular juncture in the presentation of a media content program. This causes the processing mechanism 126 to create and invoke a mark in the program. The mark button 146 can also be used to invoke a previously created mark. The keys 224 shown in FIG. 2 are merely a simplified sampling of some of the keys that the remote control 144 can include; as will be described below in connection with FIG. 3, an actual remote control 144 will typically include many more keys for performing different functions.

The remote control 144 includes control logic 228 for implementing its functionality. This control logic 228 can comprise hardwired circuitry or a processing device that implements machine readable code. The general task assigned to this control logic 228 is to translate the user 152's key actuations into signals that can be transmitted to the input interface module 206 of the presentation mechanism 126 via wireless (e.g., infrared) transmission. An interface module 230 provided by the remote control 144 actually performs the wireless transmission of signals to the processing mechanism 146.

A.3. Remote Control

Figure 3:
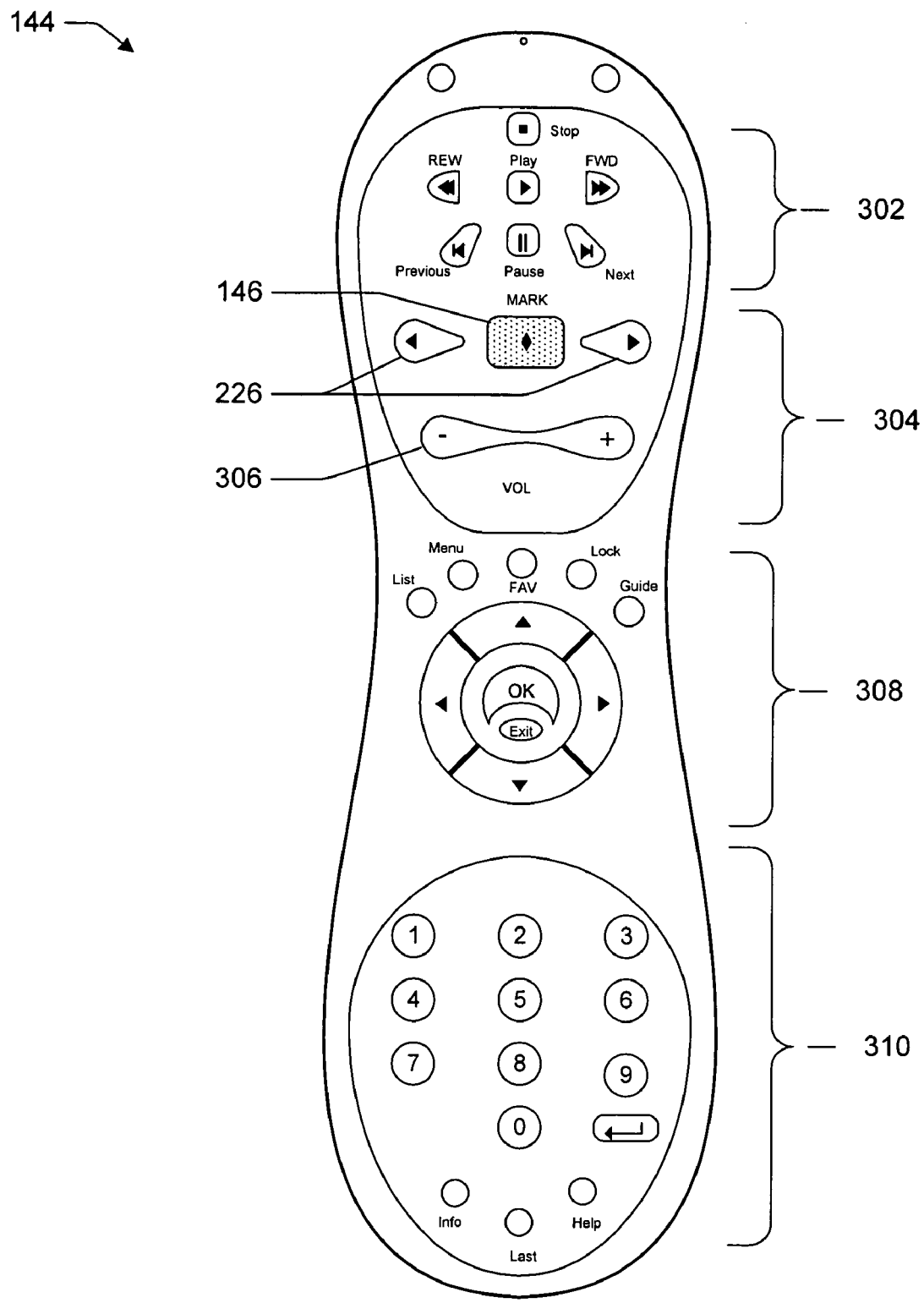
FIGS. 3 and 4 show two exemplary remote controls that can be used to interact with the system of FIG. 1.

FIG. 3 provides a more detailed illustration of the exemplary remote control 144 shown in FIG. 2. Of particular note here is the mark key 146 that allows the user to add a mark to a media content program while the media content program is being presented. The mark added by the mark key 144 identifies a particular point in the media content program. The user can also resume the media content program at the marked point by invoking the mark. As will be described in Section C, one way to invoke the mark is to press the same mark key 146 that was used to create the mark. The user can perform this task at any processing mechanism, such as at the same processing mechanism that was used to create the mark or at a different processing mechanism.

A number of variations on the mark key motif can be implemented, although are not shown. In one case, the remote control 144 can include plural mark keys that can be operated by different assigned users, such as "Mark Key A" for a first user, "Mark Key B" for a second user, and "Mark Key C" for a third user. The marks created by these respective keys will also include information that indicates the user who created the marks. The system 100 could then be configured to honor these marks by allowing only certain users to invoke their own marks. Alternatively, different mark keys can be allocated for creating marks having different characteristics. For instance, a first mark key could be used to create a mark that is more permanent than a mark created by a second mark key. Still further variations on this design motif can be implemented.

For completeness, other keys provided by the remote control 144 will be described as follows. As these keys are not the primary focus of this disclosure, their functions will only be summarily described. A series of program play control keys 302 (stop, rewind, play, forward, previous, pause, and next) are used to control the presentation of a program in a conventional manner (providing that the presentation of the program can be controlled in this manner). For instance, the previous and next keys in this set of keys 302 can be used to skip to a next program and a previous program, respectively, in a video on-demand channel, etc. Another series of keys 304 provide a grouping of frequently used keys. This series of keys 304 can include left/right navigation keys 226 to navigate backward and forward through a list of channels, and a volume control key 306 used to adjust the audio level of media content playback. This series of keys 304 also includes the above-identified mark key 146.

Another series of keys 308 provides special functionality for activating and navigating through program guides and related user interface pages. This series of keys 308 includes a list key that displays a program play list, a menu key that displays an application menu, a favorite (FAV) key that launches a favorites panel that provides a list of favorite programs, a lock key that launches a parental blocking setup screen for a current or selected show, and a guide key that launches a program guide. The left, right, up, and down keys shown in this series of keys 308 allow a user to navigate through various buttons, lists, etc. that appear in various user interface pages. An OK key disposed in the center of these navigation keys allows a user to select or activate a particular item that is displayed in the user interface pages. An exit key dismisses an active page or panel displayed by a processing mechanism.

A final series of keys 310 permits a user to enter numeric information. Within this set of keys 310, an enter key is used to forward numeric information entered by the numeric keys to an associated processing mechanism. An information key prompts the associated processing mechanism to present program information. A last key tunes the associated processing mechanism to a previously selected channel. Finally, a help key prompts the associated processing mechanism to provide help information to a user. Again, the organization of keys in the remote control 144 is entirely exemplary. For example, additional keys can be added. Alternatively, a subset of the keys shown in FIG. 3 can be omitted. Alternatively, the positional arrangement of keys shown in FIG. 3 can be varied.

Figure 4:
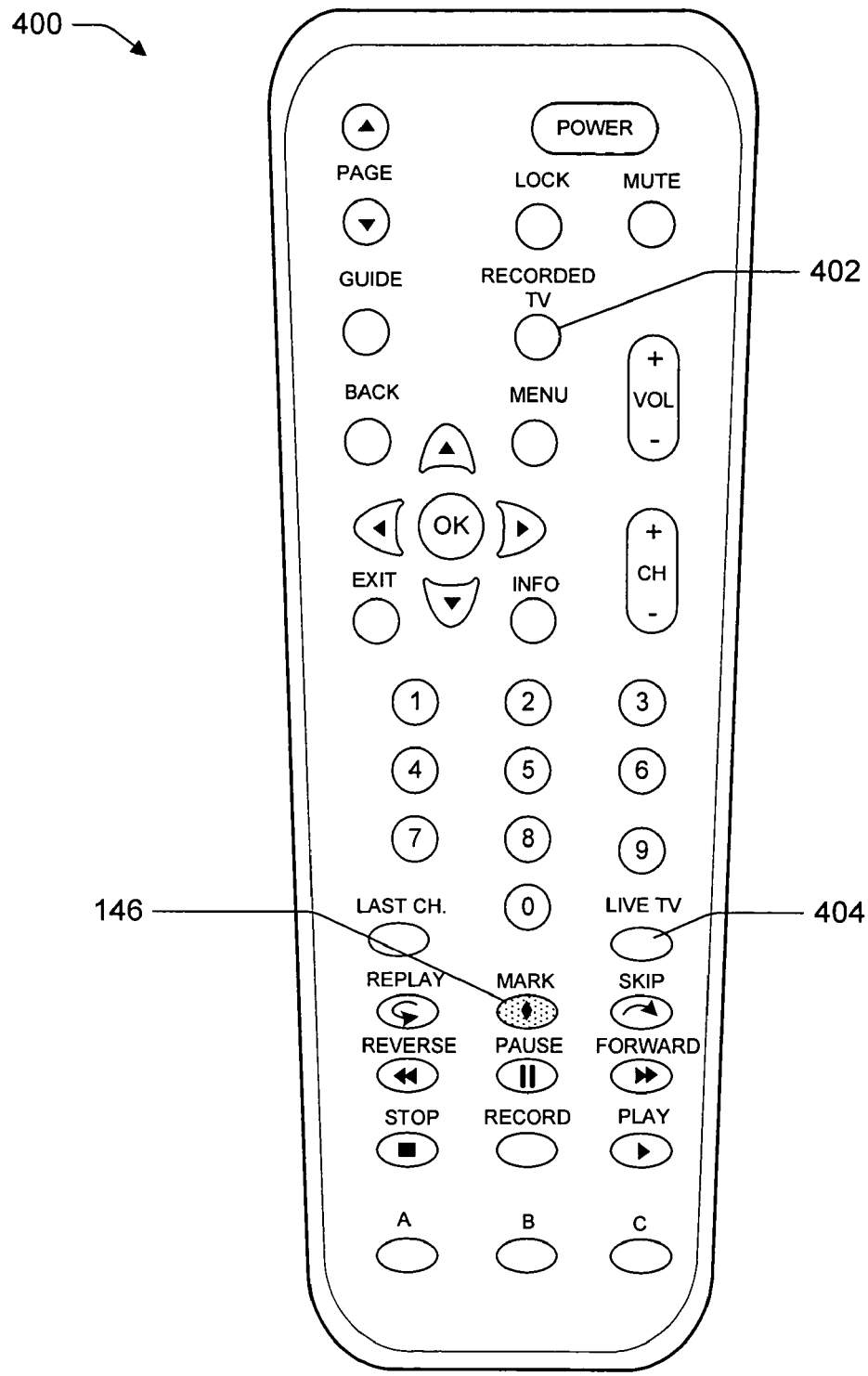

The shape, style, labeling (e.g., "MARK") and placement of the mark key 146 shown in FIG. 3 is merely exemplary, as is the overall selection and arrangement of keys in the remote control 144 shown in FIG. 3. For example, FIG. 4 shows another remote control 400 that includes a different arrangement of keys compared to the remote control 144 of FIG. 3, as well as a different placement of the mark key 146 compared to FIG. 3. Considering that remote control 400 contains many of the same keys as the remote control 144, a detailed discussion of this remote control 400 will be omitted here. Among the keys in remote control 400 that are not common to the remote control 144 are: (a) a recorded TV key 402 that prompts an associated processing mechanism to activate a recorded TV mode (which allows the user to view video programs that have been recorded or are in the process of being recorded); and (b) a live TV key 404 that prompts the associated processing mechanism to activate a live TV mode (which allows the user to view live video).

Still further remote control designs can be implemented.

B. Exemplary Method of Operation

Figure 5:
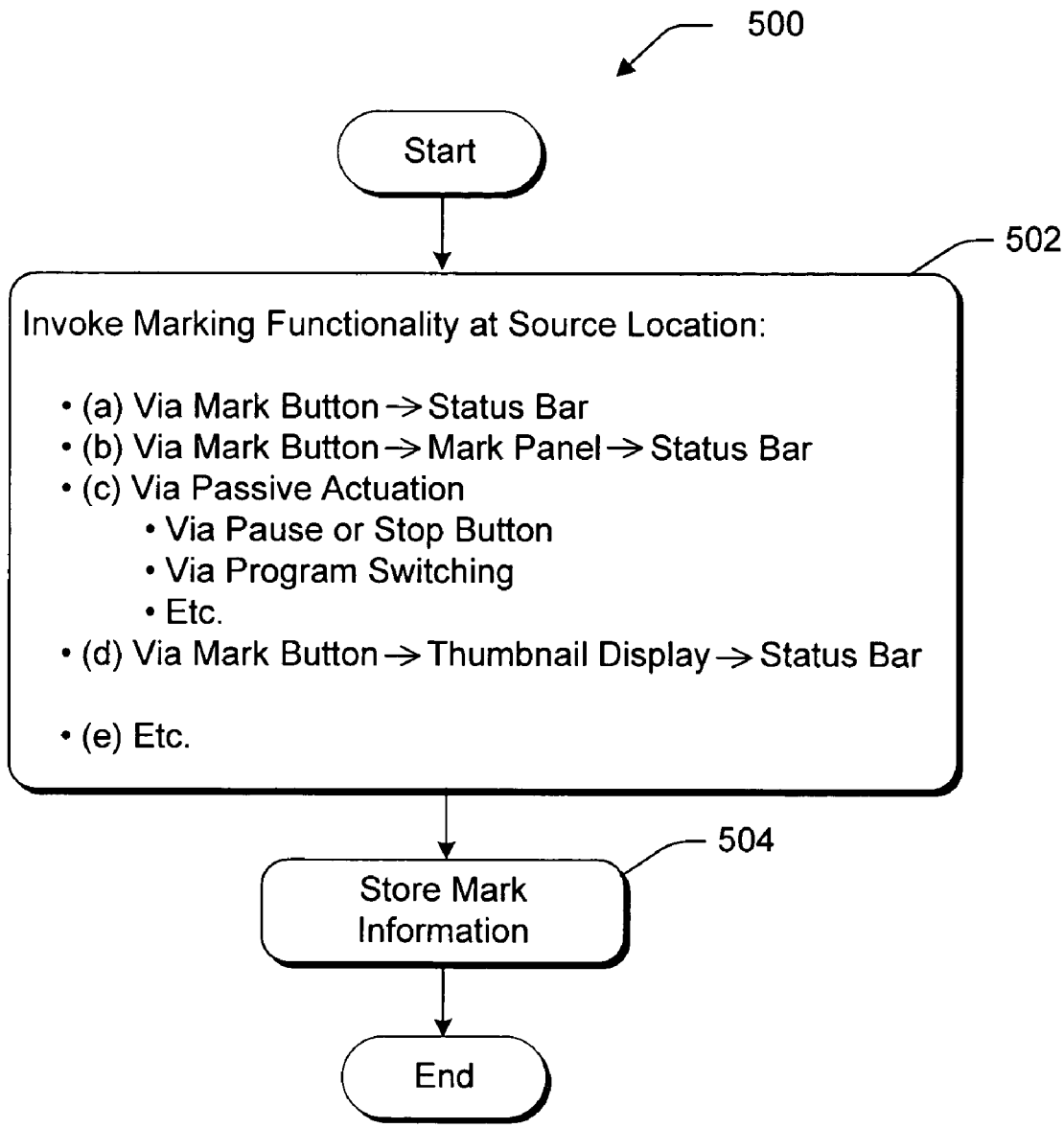
FIG. 5 shows an exemplary procedure for adding a mark to media content.
Figure 6:
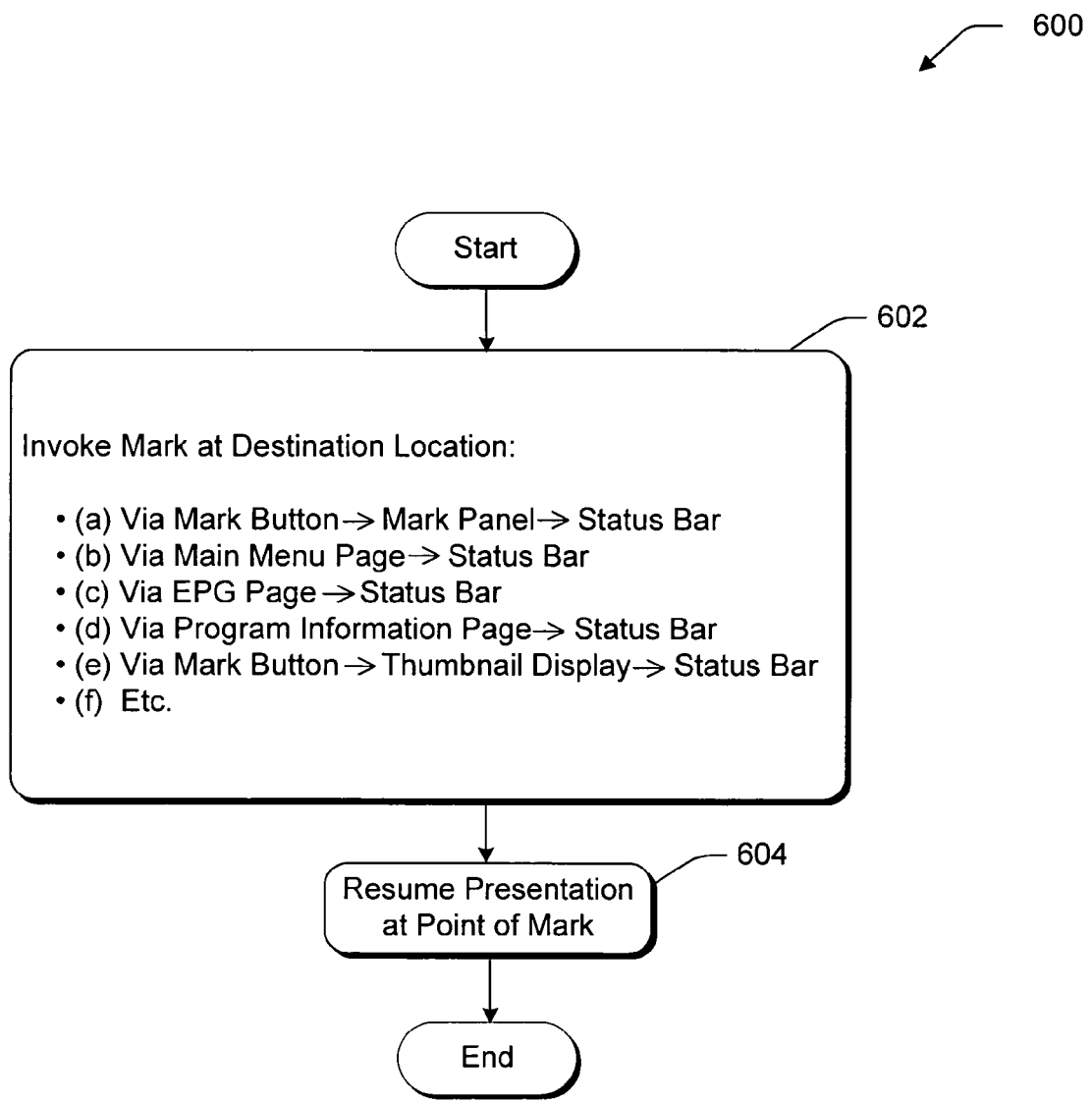
FIG. 6 shows an exemplary procedure for resuming media content from the mark that was established according to the procedure of FIG. 4.

FIGS. 5 and 6 summarize exemplary techniques for using the system 100 shown in FIG. 1 to mark media content programs and to resume the media content programs from the marked locations specified therein. Namely, the procedure 500 shown in FIG. 5 provides an overview of a method for creating a mark in a media content program. The procedure 600 shown in FIG. 6 provides an overview of a method for resuming the presentation of the media content program based on the mark added thereto in the procedure 500. To facilitate discussion, explanation of certain details presented in these figures will be deferred until Section C below.

B.1. Creating a Mark

To begin with, step 502 of procedure 500 (of FIG. 5) involves invoking marking functionality at a processing mechanism in the home environment 502. The location of this processing mechanism defines a so-called "source location," as described above, meaning that this location corresponds to the site (e.g., room or other area of the house) where the user creates the marks and at which the user may have commenced consuming a particular media program. To provide a concrete example, it will be assumed that the user 152 is using presentation mechanism 126 to create a mark in a media content program that is being presented on presentation device 134 in room 118. Further, the user 152 is using remote control 144 to perform this task.

The processing mechanism 126 can provide different mechanisms for creating the mark depending on a number of factors. Step 502 enumerates several exemplary mechanisms (identified by bullet points) which will be fully explicated in the context of Section C (below). By way of broad overview, in one scenario, the user 152 can activate the mark button 146 on the remote control 144 while the media content program is playing. This action will activate one or more of the user interface pages to be described in Section C (below). In another case, the user 152 can passively create marks through actions other than pressing the mark key 146. One way to passively create a mark is to press the pause or stop key on the remote control 144 (provided in key set 302), or to simply switch programs by pressing the channel left/right key 306. (The functionality for the creation of passive marks applies to recorded programs and VOD programs).

Next, in step 504, the processing mechanism 126 stores the mark created in step 502. As mentioned above, the processing mechanism 126 can, if possible, embed this mark in the media content itself (e.g., within a field associated with a particular frame of video corresponding to a marked juncture in the media content program). Alternatively, the processing mechanism 126 can store this mark in a separate store (or stores) with information that indicates the correlation between this mark and certain junctures in the media content program. Still other techniques can be used to store marks.

The mark itself can include various information, such as an indication of a chronological time at which the mark was created, positional information which reflects the location of the mark relative to some point in the media content (such as the beginning of the media content), information regarding where the mark was created and/or who created the mark, information regarding where the mark is permitted to be resumed and/or who is permitted to resume it, and so on. One or more of these information items are optional (such that they can be omitted).

Different marks have different "life spans" associated therewith. For instance, a mark created in a live program will only be retained for a predetermined amount of time, such as, in one entirely exemplary case, approximately 30 minutes. The system 100 deletes marks that are older than approximately 30 minutes. On the other hand, a mark created in a recorded or VOD program can be retained past the 30 minute window. However, the system 100 may be configured such that it does not include programs that contain "old" marks in various user interface pages that list programs having marks. This provision is beneficial so prevent a deluge of marks from inundating the user. A user who wishes to examine "old" marks within these programs can inspect these marks through other interface routes (such as by activating program information displays associated with individual programs having marks, etc.).

B.2. Invoking the Mark

Advancing to procedure 600 shown in FIG. 6, assume that the user 152 wishes to continuing consuming (e.g., watching) the media content program from the juncture in the program established by the mark created in the procedure 500. The user 152 can perform this task by invoking the mark at any processing mechanism located in any room in the home environment 102. Assume, for instance, that the user 152 wishes to resume the media content program at the same processing mechanism 226 that he or she used to generate the mark (e.g., in room 118). Alternatively, assume that the user 152 wishes to resume the media content program at processing mechanism 130 located in room 122 using the remote control 146. (Or perhaps another user, such as the spouse or sibling of user 152, may want to resume the program from room 118 or room 122, or anywhere else for that matter.) Whatever the case, the location where a user invokes the mark is referred to in procedure 600 as the "destination location."

Step 602 of procedure 600 involves invoking the mark. To provide a concrete context for explication, assume that the scenario described above applies in which the user 152 invokes the mark using processing mechanism 130 in association with remote control 148. The processing mechanism 130 can perform this task using different interface techniques which are enumerated by bullet points in step 602. A full explication of these techniques will be deferred until Section C (below). By way of overview here, in one scenario, the processing mechanism 130 can allow the user 152 to invoke the mark by pressing mark key 150 on the remote 148. This can result in the activation of different kinds of user interface pages. In another scenario, the processing mechanism 130 can provide information regarding marked programs within one or more high-level user interface pages (such as a menu page, an EPG page, a program information page, and so on). The user can use these high level pages as "portals" to activate a program containing marks.

Whatever the case, activation of a previously stored mark will prompt the processing mechanism 130 to resume the presentation of the media content program from the juncture in the program that the mark pertains to. Step 604 represents this operation.

Again, as mentioned above, the behavior of the system 100 in generating and invoking marks can differ depending on the type of media content program that is being handled and based on other factors. The characteristics of the marks themselves can also vary depending on the type of media content program associated with respective marks and based on other factors. The behavior of the system 100 for the different program types (and variations thereof) will be described in Section C below.

The above discussion described the use of marks as bookmarks that enable a media content program to be resumed at the junctures associated with the marks. However, the system 100 of FIG. 1 can include functionality that uses the marks for other purposes. For example, a user can add marks to a media content program for the purpose of editing that program. The marks can indicate the junctures in the program where various editing events will take place, such as the introduction of special effects (e.g., a graphical overlay, etc.). Alternatively, a pair of marks can indicate a span of the program where various editing events will take place, such as, again, the introduction of special effects. Alternatively, the pair of marks can indicate a span of program content that should be deleted. Still alternatively, the pair of marks can indicate a span of program content that should be made subject to a viewing restriction, and so on. For example, this mark-pairing feature could be particularly beneficial in obscuring a video scene that a guardian wishes to conceal from a younger viewer.

In one implementation, the system 100 can use the same mark key 146 to create marks for bookmarking and marks for editing. In this case, the marks can be interpreted differently depending on the logic (e.g., software) that is applied to process these marks. In another implementation, the system 100 can allocate different mark keys for the purpose of creating marks for bookmarking and for creating marks for editing, respectively. In this case, the marks created by these two different mechanisms can include different distinguishing attributes.

In any case, where editing is employed, the system 100 can provide an automatic processing mechanism which automatically performs some action on the media content program based on the presence of editing marks contained therein. In another implementation, the system 100 can provide a semi-automated user interface which allows a user to manually select which editing operations are to be performed based on the presence of marks contained therein.

Still other variations of this editing mechanism can be implemented.

C. Exemplary User Interface (UI) Presentations

The remaining figures, i.e., FIGS. 7-15, show various user interface pages that can be used to guide the user in creating a mark in a media content program and in subsequently resuming the media content program based on a previously created mark. Again assume, for exemplary purposes of discussion, that processing mechanism 126 is being used to create a mark using remote control 144 at the source location. Assume further that processing mechanism 130 is being used to invoke the mark that was previously created. In this exemplary scenario, the logic 216 (shown in FIG. 2) of processing mechanism 126 can be used to display the mark-creation user interface pages on the presentation device 134 in room 118, and the logic 216 of the processing mechanism 130 can be used to display the mark-invocation user interface pages on the presentation device 138 in room 122. These user interface pages can generally comprise graphical overlays that are displayed to the user 152 on the presentations devices (134, 138). These user interface pages may cover the entire presentation device display surface, or may cover only part thereof.

C.1. UI Functionality for Creating Marks

As indicated in step 502 of FIG. 5, different techniques are available for creating marks. Exemplary UI pages for performing these different techniques are described as follows.

Regarding Step 502(a)

Figure 7:
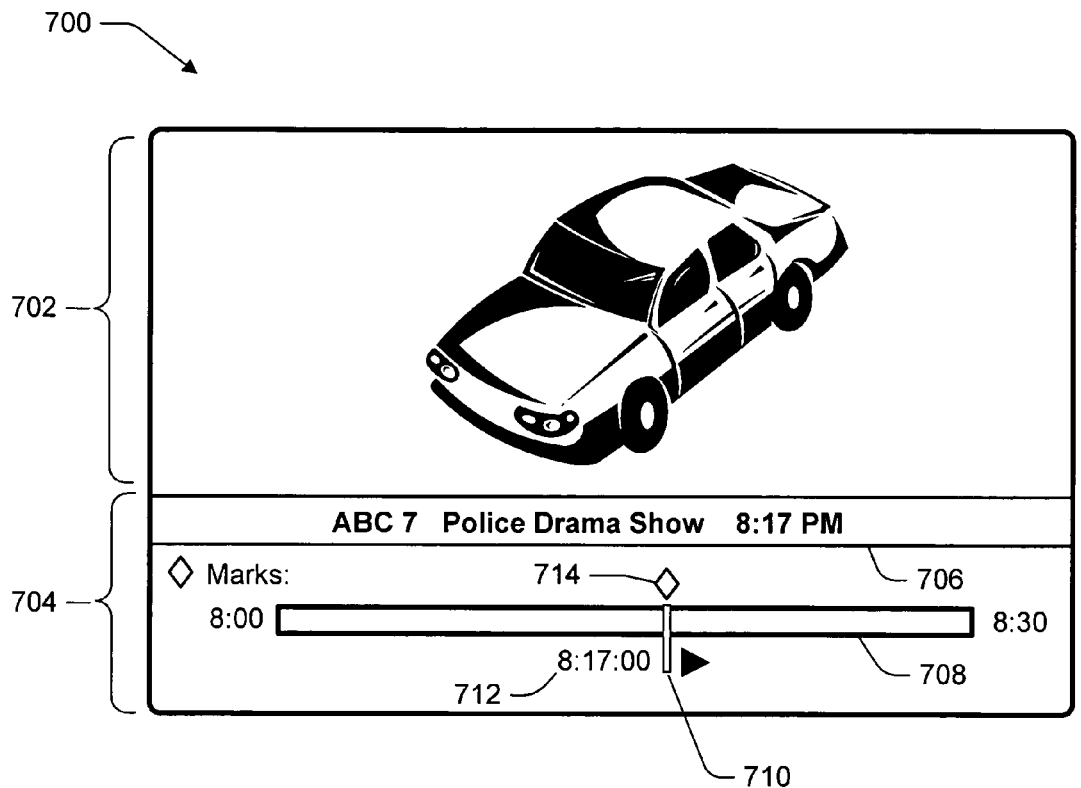
FIGS. 7-15 show different user interface pages that can be used to interact with the system of FIG. 1.

Consider first a user interface page 700 shown in FIG. 7. Assume that the user 152 is watching a police drama television program using processing mechanism 126 and associated presentation device 134. A frame 702 of that program (e.g., the exemplary and fictitious program called "Police Drama Show") is displayed in FIG. 7 in a top field of the user interface page 700.

One way to create a mark in this program is to press the mark key 146 on the remote control 144 while a so-called status bar 704 is being displayed. (Such a status bar 704 can alternatively be displayed in a top portion of the user interface page 700, or, for that matter, anywhere on the user interface page 700.) The status bar 704 itself includes a band 706 that conveys the title of the program (e.g., "Police Drama Show"), the source of the program (e.g., live broadcast station ABC 7), and a current time (e.g., 8:17 PM). The status bar 704 also includes a timeline 708 that spans a half hour segment allocated to the program (e.g., in this exemplary and non-limiting case, from 8:00 PM to 8:30 PM). In general, the timeline 708 can be configured to span the length of the program that the user is watching, although other timeline lengths can be used (such as a timeline length that spans a part of the program, a timeline length that spans a longer period than the program, and so on). A vertical line 710 designates a current position within the program (that is, this line 710 designates, chronologically, how far the program has advanced to its completion). Information 712 conveys the current position in alphanumeric characters, e.g., 8:17:00 PM.

In response to pressing the mark key 146 on the remote control 144, the processing mechanism 126 adds a mark icon 714 above the timeline 710 to designate the point in the program when the user 152 pressed the mark button 146. The icon 714 is shown as having a diamond shape, but any kind of icon having any kind of shape can be used. In one implementation, the processing mechanism 126 can allow different users to create their own associated marks; in this case, the processing mechanism 126 can assign different colors to different users' icons. Or the processing mechanism 126 can assign different icon colors and/or shapes to designate marks having different characteristics.

Figure 8:
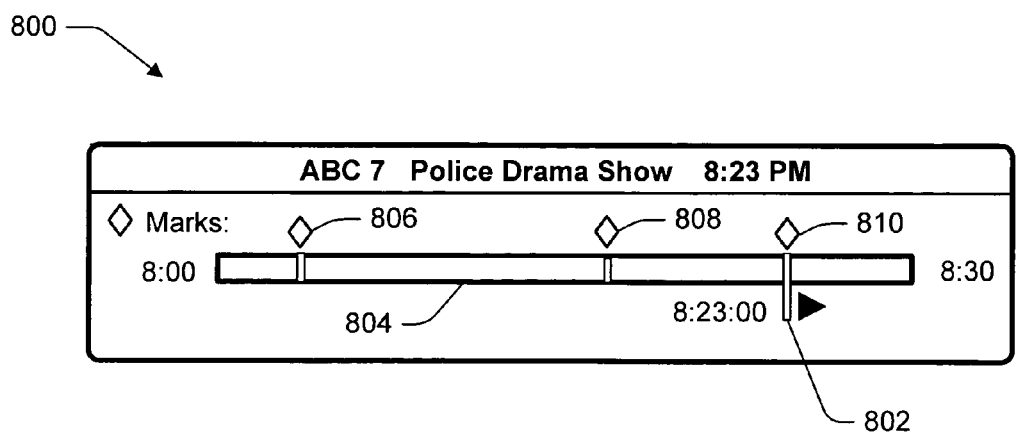

FIG. 8 shows another status bar 800 (without its accompanying video frame) in which the user 152 has created several marks in the program, instead of just one mark (as was the case in FIG. 7). FIG. 8 can specifically correspond to the case where the user is currently watching the police drama show described above at a later point in the program, e.g., at time 8:23 PM. FIG. 8 shows the current state of the program with a vertical line 802 which intersects the timeline 804. At this point in time, assume that the user 152 has created three marks by successively pressing the mark key 146 on three occasions at three different respective times during the presentation of the program. This is reflected by the three mark icons 806, 808, and 810 positioned at different representative times along the timeline 804. In one implementation, the processing mechanism 126 sets no constraints on the number of marks that a user can create for a given program. But the processing mechanism 126 can be configured to check for and remove redundant marks (e.g., marks that occur at the same time, or within a very small time interval).

In one case, in both FIGS. 7 and 8, the processing mechanism 126 can be configured to create the marks as soon as the user 152 activates the mark key 146 on the remote control 144. In another case, the processing mechanism 126 can be configured to require the user to take some other confirmatory action, such as by activating an "OK" button, etc.

By way of summary, the strategy shown in FIGS. 7 and 8 for creating marks corresponds to the technique labeled "(a)" within step 502 of FIG. 5.

Regarding Step 502(b)

Figure 9:
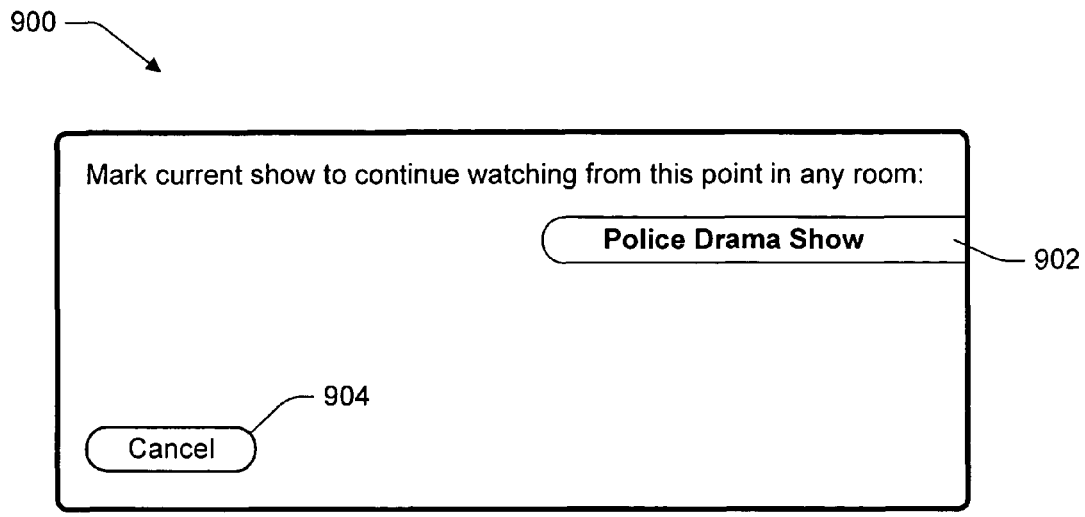

On the other hand, FIG. 9 presents a case in which the user 152 presses the mark key 146 when the status bar (e.g., panel 704 in FIG. 7) is not currently being displayed. In this exemplary case, the processing mechanism 126 can respond by presenting the mark panel 900 shown in FIG. 9. This mark panel 900 provides an entry button 902 designating the program that the user is currently watching, in this case the exemplary and fictitious show "Police Drama Show." By pressing the entry button 902, the user can add a mark to the program "Police Drama Show" at the point in time corresponding to when the user pressed the mark button 146 on the remote control 144. (Alternatively, the system 100 can be configured to add the mark to the program at the point in time corresponding to when the user presses the entry button 902.) By pressing a cancel button 804, the user 152 can remove the mark panel 900 without creating a mark. If the user 152 does decide to add a mark to the show currently being watched, the processing mechanism 126 is configured to briefly display a status bar (having the basic format shown in FIGS. 7 and 8). The status bar serves to show the user 152 the effects of creating a mark, that is, by showing a diamond-shaped mark icon at an appropriate location above the timeline of the status bar.

By way of summary, the strategy shown in FIGS. 8 for creating marks corresponds to the technique labeled "(b)" within step 502 of FIG. 5.

Regarding Step 502(c)

In addition to the above scenarios, the processing mechanism 126 can create marks in other circumstances (where the user has not pressed the mark button 146 on the remote control 144). In one case, a passive mark is automatically created when the user 152 presses a stop button on the remote control 144, e.g., for the cases of recorded programs or video on-demand (VOD) programs. These kinds of passive marks serve as temporary shortcuts to resuming any stopped video stream.

In another case, the processing mechanism 126 will automatically set a passive mark when the user 152 leaves either a recorded program or a VOD program to go to another program. In one exemplary implementation, the processing mechanism 126 will not set a passive mark when the user 152 tunes away from a live program that is not being simultaneously recorded. Further, in one exemplary implementation, the processing mechanism will not set a mark when the user 152 tunes away from a live program that is being simultaneously recorded if the user 152 is watching the program in live mode. (The "live mode" refers to the "consumption" of a live program directly from the streaming source, rather than indirectly from a store which is recording the streaming source; the latter technique is referred to as "recorded mode.")

By way of summary, the strategy shown in FIGS. 9 for creating marks corresponds to the technique labeled "(c)" within step 502 of FIG. 5. The three techniques (a-c) shown in FIG. 5 are merely exemplary; other techniques can be provided for creating marks.

General Considerations

In general, and as mentioned above, marks have different characteristics depending on the type of program that they are associated with and the circumstances under which the program is being processed. Marks added to live programs have limited lifespan, such as, in one exemplary and non-limiting case, approximately 30 minutes. This means that the user 152 is given approximately a 30 minute window in which to activate a mark and thereby resume the marked program. The system 100 automatically deletes marks that have been placed in a live program after their respective 30 minute windows have expired.

On the other hand, marks added to recorded programs and VOD programs can be retained more permanently, that is, longer than the above-described 30 minute window. (But, as described below, the user interface pages which identify lists of marked programs may be configured to exclude those programs containing marks over 30 minutes old so as not to unduly inundate these lists with programs containing "old" and potentially "stale" marks. That is, there is a potential that the user 152 is uninterested in these "old" marks, and their inclusion on interface pages would only obfuscate the user's interface experience. The system 100 can include alternative means for accessing these old marks, to be described below.)

The information stored when a mark is created can include a timestamp that reflects when the mark was created, or which reflects the mark's position relative to some point in program (such as the beginning of the program). The store information can also include information regarding the room (and associated processing mechanism) where the mark was created, the user who the mark, and so on.

Finally, various provisions also exist for deleting marks that have been previously set. In one technique, the user 152 can delete a mark by selecting it using the status bar (such as the status bars shown in FIGS. 7 and 8). Pressing the mark key 146 when a previously created mark icon has been selected will delete the mark corresponding to that mark icon. In other words, pressing the mark button 146 when the status bar is being displayed and a mark in the status bar has been selected will have the effect of toggling that mark icon on and off (and thereby successively creating and deleting the mark).

Also, the system 100 will automatically delete a mark by default when, for a live program, the pause buffer content associated with the mark has been deleted. A mark is also automatically deleted when, for a recorded program, the recorded program has been deleted. A mark is also automatically deleted when, for a VOD program, the VOD program (e.g., movie) has expired.

C.2. Resumption of Programs Based on Marks

As shown in step 602 of FIG. 6, the system 100 also provides multiple ways to resume marked media content. Again, to facilitate discussion, assume that the user 152 (or another user) has marked one or more programs using processing mechanism 126 in room 118 (the source location) and then the user 152 has retired to room 122 that contains processing mechanism 130. Assume that the user 152 wishes to resume the presentation of marked media program using the presentation mechanism 130 and remote control 148.

Regarding Step 602(a)

One way to perform the resumption of a video program is via the mark panel introduced above. Consider the mark panel 1000 shown in FIG. 10. In this case, again assume that the user 152 is watching the program "Police Drama Show" (but, this time, using processing device 130 in room 122). Further assume that the user 152 presses mark key 150 on the remote control 148. This prompts the processing mechanism 130 to generate the mark panel 1000. The mark panel 1000 again displays an entry button 1002 corresponding to the program currently being displayed (in this case "Police Drama Show"), as well as a cancel button 1004 that allows the user 152 to remove the mark panel 1000 without creating a mark. As described above, if the user 152 activates entry button 1002, then the processing device 130 will create a mark in the program currently being viewed (e.g., "Police Drama Show").

In addition, the mark panel 1000 includes a collection of entry buttons 1006 that identify other programs that have marks that have already been set. In this exemplary and non-limiting case, only three shows are shown in collection 1006, but the user 152 may retrieve additional marked shows (if they exist) by activating the scroll icon 1008. The system 100 can arrange the list of programs in the collection 1006 in chronological order depending on the timestamp associated with each program's most recent mark. That is, the topmost entry in the collection 1006 will identify a program that has a mark that is more recent than any other mark in any other program in the collection 1006, and so on. In one implementation, the collection 1006 of programs contains only one entry button per program, even though that program may contain multiple marks. In another implementation, the collection 1006 can contain duplicate entry buttons for a single program corresponding to separate instances of marks in the single program that occur at different times. If a program in the collection 1006 is locked because of parental restrictions (or any other reason), the processing mechanism 130 can be configured to omit its name from the list of program names in the collection 1006.

If the user presses any one of the entry buttons in the collection 1006, the processing mechanism 130 will respond by removing the mark panel 1000 from the display and then displaying a status bar corresponding to the selected program. The status bar has the basic graphical layout illustrated in FIGS. 7 and 8. The processing mechanism 130 can then be configured to automatically resume the selected program from the most current mark in the program. In other words, in the case in which the status bar shows multiple mark icons arranged from left to right across the timeline of the status bar, the processing mechanism 130 can be configured to resume the program starting at the point identified by the rightmost mark icon.

In addition, if the status bar reveals plural mark icons, the processing mechanism 130 can allow the user 152 to navigate between these mark icons and select another icon (other than the most recent mark icon which is selected by default). This will prompt the processing mechanism 130 to resume the program at an earlier point in time. In general, the processing mechanism 130 can be configured to allow the user 152 to navigate through a series of mark icons using the left and right keys provided on the remote control 148 (such as the left and right keys in the set of keys 308 shown in FIG. 3). Upon advancing to each mark icon, the processing mechanism 130 can further be configured to display a video frame (e.g., above the status bar) associated with the point in time in the program that corresponds to the identified mark icon. This gives the user 152 some guidance as to where the mark lies within the course of the program. Further, the processing mechanism 130 can be configured to change the color of a selected mark icon with respect to other, non-selected, mark icons. Upon selecting a desired mark icon, the user can activate the resumption of the marked program by pressing a play key, an OK key, or some other suitably configured key on the remote control 148.

Figure 10:
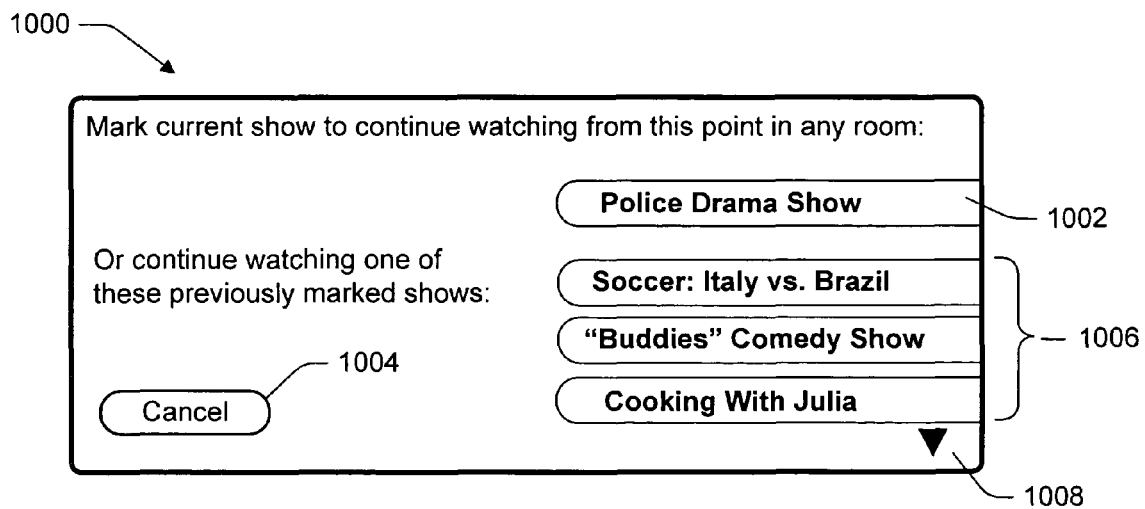

By way of summary, the strategy shown in FIGS. 10 for invoking marks corresponds to the technique labeled "(a)" within step 602 of FIG. 6. Note that the mark panel can be used for both creating new marks and for invoking preexisting marks. This dual purpose nature of the mark panel makes it easier for a user to become familiar with and utilize the mark panel; thus, this interface strategy improves the user's user interface experience.

Regarding Steps 602(b)-(d)

The processing mechanism 130 provides other mechanisms for resuming a marked program besides the mark panel 1000 shown in FIG. 10. For instance, the system 100 provides various overview user interface pages. These overview user interface pages can be modified to provide supplemental information regarding the presence of programs that contain marks.

Figure 11:
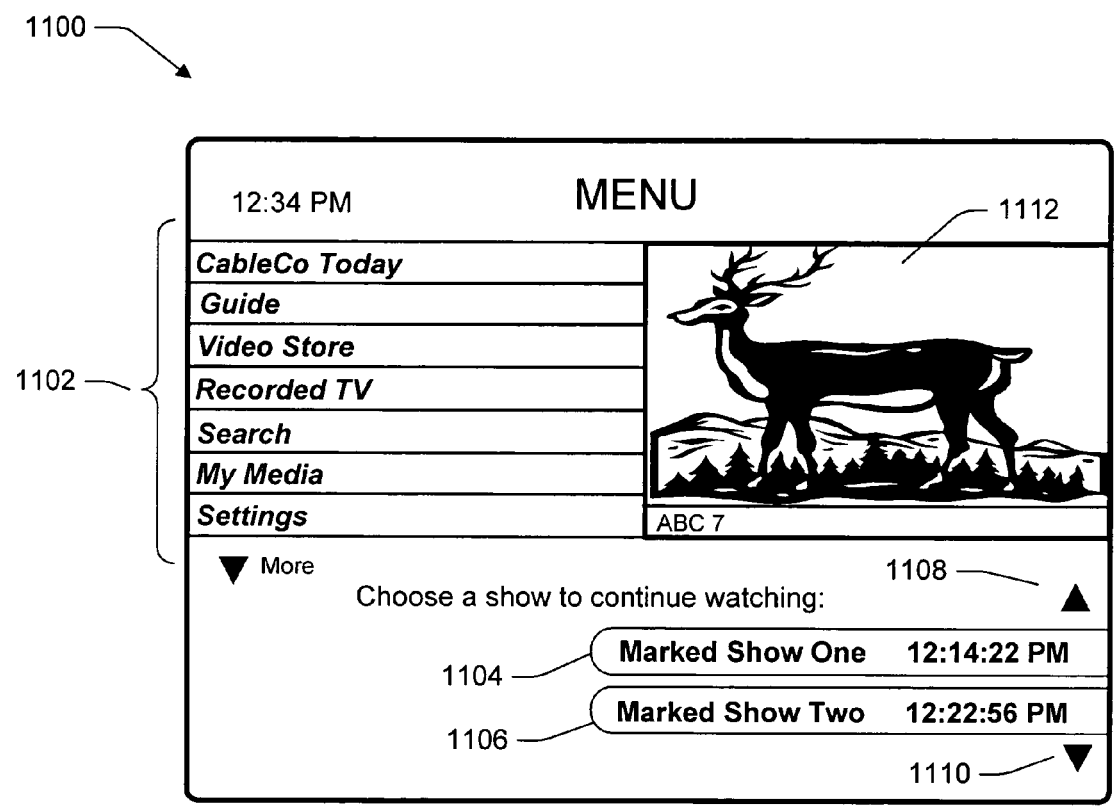

FIG. 11 shows one such overview user interface page, i.e., a menu user interface page 1100. The processing mechanism 130 can be configured to show this menu user interface page 1100 as a basic introductory page or a so-called "home" or "main" page. The user interface page 1100 includes a collection 1102 of menu items that identify several options that the user 152 can select to activate different services provided by the system 100. One such option is identified as "Guide." Selecting this option activates an electronic program guide (EPG) that shows the user 152 the programs that are available for selection (such as by using the familiar chronological grid layout). Another option is identified as "Video Store." Selecting this option activates a menu of video on-demand (VOD) programs from which the user 152 may select. Another option is identified as "Recorded TV." Selecting this option activates a menu of programs that have been previously recorded (or are in the process of being recording). These recorded programs can be stored locally in the home environment 104, such as on hard magnetic disks, optical disks, and so on, or can alternatively be stored at an external site or sites.

In addition to the above-identified main menu selections, the menu user interface page 1100 can identify a plurality of programs that the user 152 can opt to continue watching (e.g., because they each contain one or more marks that have been previously defined). More specifically, the menu user interface page 1100 shows program entry buttons 1104 and 1106 corresponding to two programs having existing marks. The user 152 can select additional program entries containing marks (if they exist) by activating the scrolling icons 1108, 1110. The list of programs containing marks in the menu user interface page 1100 can be limited to those containing marks within a window of approximately 30 minutes, such that programs having marks that are older than 30 minutes are not displayed. Like the mark panel 1000 shown in FIG. 10, the list of programs contained in the user interface page 1100 can be ordered from top to bottom on the basis of how current the most current mark in each program is. The menu user interface page 1100 only allocates one button entry in the list for each program containing marks, even though any one of these programs may contain multiple marks. In another implementation, however, the list of programs could include multiple button entries corresponding to different marks within a single media content program.

Finally, the menu user interface page 1100 can include a picture 1112 that shows a program which the user's processing mechanism is currently presenting (e.g., the program that the processing mechanism is currently tuned to). Alternatively, the picture 1112 can provide a video frame associated with a marked position in one of the marked programs. For example, assume that entry button 1104 corresponds to a recorded television program (e.g., pertaining to nature). If the user selects this entry button 1104, then the picture 1112 can be configured to show the video frame associated with this program's most recent mark.

Activating any button entry corresponding to a program that contains marks will prompt the processing mechanism 130 to activate the program thus selected. Like the case of the activation of the mark panel, the processing mechanism 130 can specifically be configured to show a status bar associated with the selected program and to automatically select the most current mark that appears in the timeline of that status bar (providing that there are multiple marks in the selected program). The processing mechanism 130 allows the user 152 to navigate among multiple marks to select a resume point other than the most current marked point; this navigation can be implemented using left and right keys provided on the remote control 148.

Other overview user interface pages (not shown) can be modified, in a similar manner to that illustrated in FIG. 11, to include a listing of programs containing marks. For instance, the system 100 can be configured to display a list of marked programs within a user interface page devoted to presenting an electronic program guide (EPG). Alternatively, or in addition, the system 100 can be configured to display entry buttons in a program information page associated with an individual program (if that individual program in fact includes at least one mark).

By way of summary, the above-identifies strategies for invoking marks correspond to the techniques labeled "(b)," "(c)," and "(d)" within step 602 of FIG. 6.

General Considerations

In one implementation, the user interface pages that display lists of programs containing marks (such as the main menu presentation 1100 shown in FIG. 11, the mark panel presentation shown in FIG. 10, etc.) can exclude programs having marks that are more than approximately 30 minutes old (even though it is permitted to retain marks for recorded programs and VOD programs that are more than 30 minutes old). This provision is useful so that the lists of programs containing marks do not grow too large and unwieldy. However, the system 100 can provide functionality for allowing the user 152 to access marked programs containing old marks. For instance, the system 100 can allow the user 152 to access old marks for recorded and VOD programs via special pages devoted to providing listings of programs containing old marks. Alternatively, or in addition, the system 100 can allow the user 152 to access old marks via individual program information pages associated with programs that contain one or more marks.

It is possible that a situation may arise where interface page indicates that a marked program is available, but that program's mark expired soon after the page was displayed (e.g., because the mark is now over approximately 30 minutes old, or because of some other reason). In this case, if the user 152 activates the program containing the expired mark, the system 100 can be configured to present an error message that indicates that the program could not be resumed.

In any of the user interface pages that present lists of programs containing marks, titles of blocked programs (because of, for instance, parental control restrictions) can be replaced with text that indicates that the programs are locked, such as text that reads: "Locked Program."

C.3. Mark Creation and Program Resumption Using Thumbnail Images

Regarding Step 502(*d*)

Instead of the mark panel 1000 shown in FIG. 10, which contains only alphanumeric information, the system 100 can allow the user 152 to create marks and to invoke previously created marks using user interface pages containing thumbnail images. For instance, assume again that the user 152 is watching a program called "Police Drama Show" using processing mechanism 126 in room 118. Assume further that the user 152 activates the mark key 146 of the remote control 144 used to interact with the processing mechanism 126. This prompts, instead of the alphanumeric mark panel 1000 shown in FIG. 10, the user interface page 1200 shown in FIG. 12 that contains thumbnail images.

The user interface page 1200 provides a frame 1202 of a program that is currently being presented at the time when the user 152 presses the mark key 146. That is, the frame 1202 corresponds to a frame that was currently being played within a stream of frames when the user 152 pressed the mark button 146 of the remote control 144. In addition, the user interface page 1200 includes a thumbnail display region 1204 disposed at the bottom of the user interface page 1200 (or at a different location in the user interface page 1200). The thumbnail display region 1204 includes a series of thumbnail images (1206-1212). Thumbnail images are generally small renditions of video frames in respective different programs. The first thumbnail image 1206 corresponds to the video frame 1202 shown in the top portion of the user interface page 1200. The user interface page 1200 can also use various techniques for highlighting the first thumbnail image 1206 when this user interface page 1200 is first activated, such as by presenting this thumbnail image 1206 in a highlighted background color or by drawing a highlighted border around the thumbnail image 1206. Other thumbnail images (1208, 1210, 1212) in the thumbnail display region 1204 correspond to video frames in other programs associating with marks added to those respective programs. In one case, the user interface page 1200 can arrange the thumbnail images (1206-1212) from left to right according to the relative currency of their respective most recent marks (e.g., such that the program having the most current mark is displayed at the farthest left).

The thumbnail display region 1204 can also initially include a text legend 1214 across its top which informs the user 152 that the program currently being watched has been marked, and that they have a 30 minute period to resume the program. The thumbnail display region 1204 also includes alphanumeric time information associated with each thumbnail image; this information indicates the point in time, for each marked program, when the mark was generated.

In one scenario, once the user interface page 1200 has been activated, the system 100 automatically establishes the mark without requiring the user 152 to perform further actions. In another case, the system 100 requires the user 152 to press a confirmatory button on the remote control 144, which prompts the system 100 to create the mark associated with thumbnail image 1206, or which prompts the system 100 to present a status bar (having the form of the status bars shown in FIGS. 7 and 8).

Figure 12:
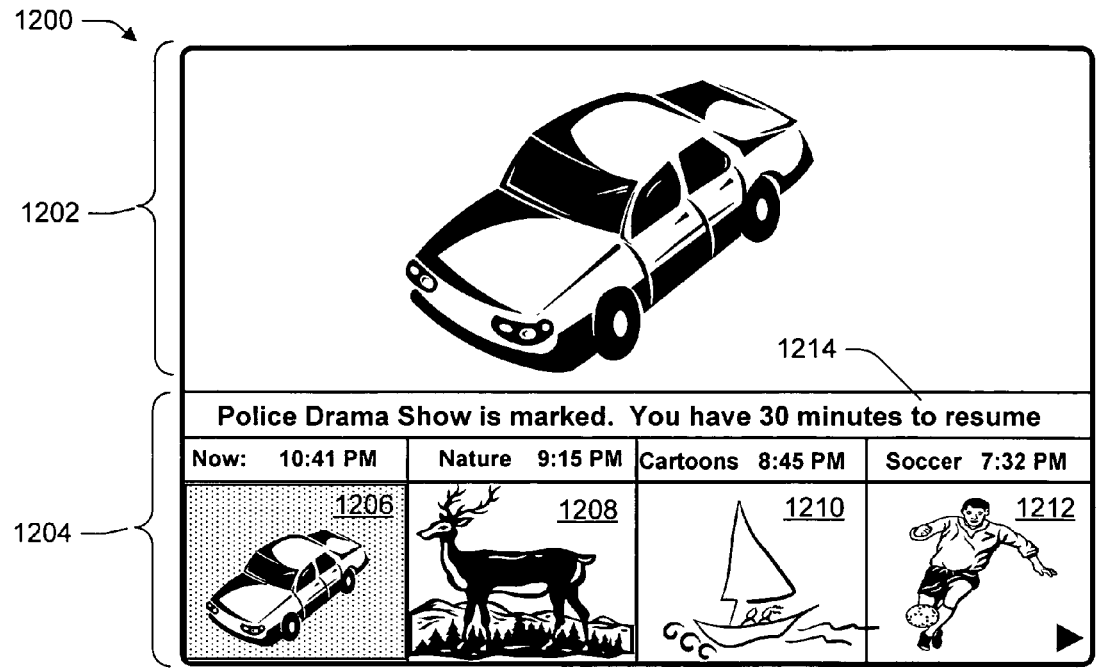

By way of summary, the strategy shown in FIG. 12 for creating marks corresponds to the technique labeled "(d)" within step 502 of FIG. 5.

Regarding Step 602(*e*)

Figure 13:
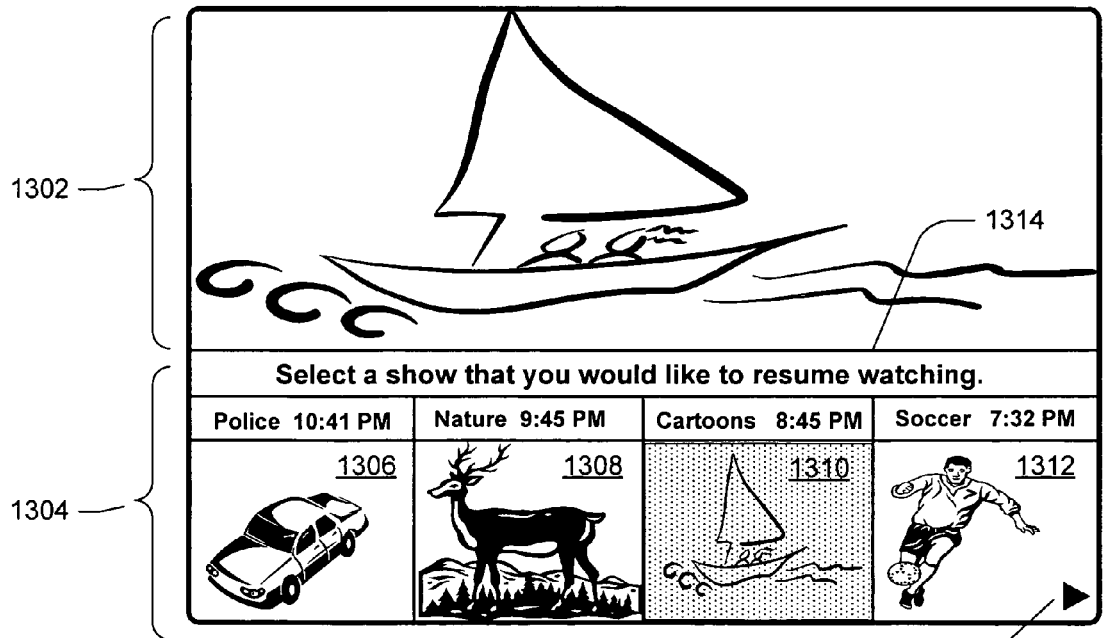

Instead of creating a new mark, the user 152 can use the user interface page 1200 shown in FIG. 12 to invoke a previously created mark and therefore resume its associated program at a point corresponding to the previously created mark. Once again, assume that the user 152 has moved to room 122 where the user 152 wishes to resume a program using processing device 130, remote control 148, and associated presentation device 138. FIG. 13 shows an exemplary user interface page 1300 that allows the user 152 to resume a marked program using the thumbnail image motif shown in FIG. 12.

Like the case of FIG. 12, the user interface page 1300 shown in FIG. 13 includes a video frame 1302 that shows a snapshot of a program corresponding to a marked position within a video stream. The user interface page 1300 also includes a thumbnail display region 1304 that includes thumbnail images (1306-1312). Assume that the user 152 presses the mark key 150 of remote control 148 while the program "Police Drama Show" is being played. Accordingly, the leftmost thumbnail image 1306 would correspond to a video frame in that program that was being presented at the time that the user 152 activated the mark button 150.

However, instead of creating a mark in the currently playing program, the user 152 in the FIG. 13 scenario wishes to resume a previously marked program. The user interface page 1300 can itself prompt the user to make such a selection via the text legend instruction 1314: "Select a show that you would like to resume watching." This legend can be automatically presented a predetermined time after the legend 1214 (of FIG. 12) is presented, such as a few seconds.

To resume a previously marked program, the user 152 can navigate across the thumbnail display region 1304 to one of the thumbnail images (1308-1312) to the right of the thumbnail image 1306. This can be performed by actuating the right key on the remote control 148 (e.g., the right arrow key in the group of keys 308 on the remote control 148). An icon 1316 allows a user to display additional thumbnail images (if they exist) that are older than the rightmost thumbnail image 1312 currently displayed in the thumbnail display region 1304.

Assume that the user 152 moves to the third thumbnail image 1310, which corresponds to a program providing live cartoons. A currently selected thumbnail image can be discriminated from others by displaying it in a highlighted background color, by presenting a highlighted border around it, and so on. The video frame 1302 shown in the top portion of the user interface page 1300 provides a fuller sized version of the thumbnail image 1310.

The user 152 can activate the thumbnail image 1310 by pressing an appropriate key of the remote control 148, such as a play key, an OK key, etc. This can cause the immediate resumption of the marked program starting at the position in the program corresponding to the marked video frame shown in the thumbnail image 1310. Alternatively, activating the thumbnail image 1310 can prompt the system 100 to display a status bar which shows where the marked resumption point occurs in the context of the timeline of the status bar. The user can then activate the resumption of the media content starting at the marked point by pressing an appropriate key on the remote control 148. Or the user 152 can navigate to a different mark in the program. If the user activates a previously marked program in the manner described above, as opposed to the currently marked program represented by the leftmost thumbnail image 1306, the system 100 can be configured to remove the mark from the currently displayed program corresponding to the leftmost thumbnail image 1306.

In the above examples, the thumbnail display region includes only one thumbnail image per program containing marks, even though some of these programs may include plural marks. In another case, the thumbnail display region can include plural thumbnail images for a single program that includes plural associated marks. These thumbnail images can be sorted from left to right according to time in the manner discussed above.

Figure 14:
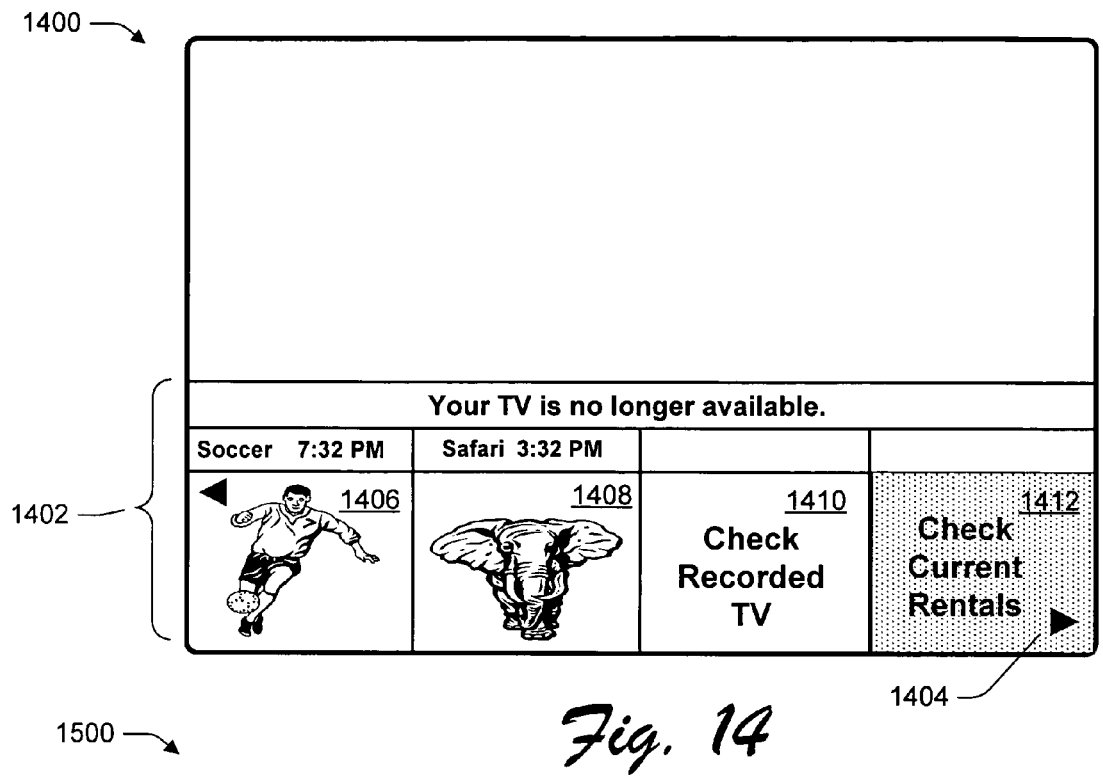

FIG. 14 shows a user interface page 1400 including a thumbnail display region 1402 that results when the user 152 repeatedly actuates the advance-to-the-right cursor 1404. To repeat, the user interface page 1400 presents the thumbnail images in chronological order starting with the program having the most recent marked point (on the far left) and ending with the program having the least current marked point (on the far right).

As mentioned above, live video programs only retain their marks for an approximately 30 minute window (that is, according to one exemplary and non-limiting example; in general, both shorter and longer windows can be implemented as well). But recorded programs and VOD programs can potentially include marks that are older than 30 minutes. The user interface page 1400 shown in FIG. 14 allows the user 152 to access these programs containing old marks via access point 1410 (for recorded programs containing marks) and via access point 1412 (for VOD programs containing marks). That is, these access points (1410, 1412) can provide portals that allow the user 152 to access programs having old marks.

Finally, to facilitate discussion, the above description emphasized the marking of audiovisual media content programs, and the resumption of such programs based on marks added to the programs. But the techniques discussed above can apply to any kind of information, such as games, music, photos, etc.

Figure 15:
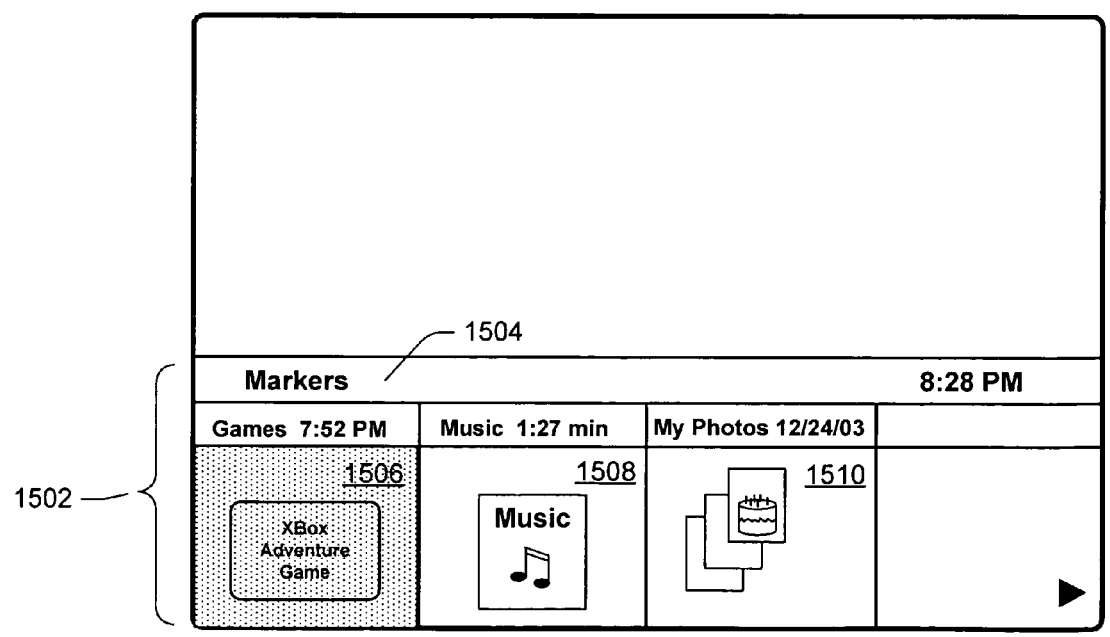

For instance, FIG. 15 shows the application of the thumbnail presentation motif introduced in FIGS. 12-14 to various other types of resources. The user interface page 1500 shown in FIG. 15 includes a thumbnail display region 1502 having a legend 1504 which indicates that the current time is 8:28 PM. The thumbnail display region 1502 includes a first thumbnail image 1506 that pertains to a certain point in a game, a second thumbnail image 1508 that pertains to a certain point in musical piece, and a third thumbnail image 1510 that pertains to a certain photo in a sequence of photos.

By way of summary, the strategy shown in FIGS. 13-15 for invoking pre-exiting marks corresponds to the technique labeled (e) in step 604 of FIG. 6.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for presenting audio/video information, the method comprising:
   presenting the audio/video information using a first processing mechanism;
   receiving, while presenting the audio/video information using the first processing mechanism, a user-submitted command, the command activated by operation of a mark button on a remote control associated with the first processing mechanism;
   adding, in response to the user-submitted command, a mark that is associated with the audio/video information, using a marking mechanism of the first processing mechanism;
   transferring the audio/video information from the first processing mechanism to a second processing mechanism, the second processing mechanism being physically distinct from the first processing mechanism;
   displaying a visual indicator of the mark at the second processing mechanism, the displaying comprising:
      displaying, within a thumbnail display region, a thumbnail image of a frame of the audio/video information presented using the first processing system, the frame taken from the audio/video information being displayed at a point in time that the mark was created, the thumbnail image accompanied, upon selection, by a text legend indicating time remaining on a fixed period of time, after which the thumbnail image will be removed;
      displaying, in a larger region, a larger sized version of a thumbnail image selected from among thumbnail images in the thumbnail display region;
      removing the thumbnail image from the thumbnail display region at conclusion of the fixed period of time; and
      displaying an access point to allow access to thumbnail images removed after the fixed period of time; and
   presenting the audio/video information using the second processing mechanism based on the mark added using the first processing mechanism, the presenting in response to operation of a mark button on a remote control associated with the second processing mechanism.

2. The method according to claim 1, wherein the first processing mechanism is contained in a first area in a building and the second processing mechanism is contained in a second area in the building.

3. The method according to claim 1, wherein the audio/video information comprises a media content program.

4. The method according to claim 1, further comprising deleting the mark in response to a user-submitted selection of the visual indicator of the mark and a user-submitted command to delete the mark.

5. The method according to claim 1, wherein the adding the mark precludes the creation of another mark if that other mark occurs at the same time, or within a very small time interval as the first-mentioned mark.

6. The method according to claim 1, wherein part of the audio/video information is a video image taken from the audio/video information which is associated with the mark.

7. The method according to claim 1, wherein the displaying the visual indicator of the mark comprises presenting the visual indicator of the mark at a display position along a timeline, where the display position conveys a juncture at which the mark occurs within the audio/video information.

8. The method according to claim 1, wherein the presenting is invoked by the activation of an input selection item associated with the audio/video information containing the mark, wherein the input selection item appears in a display that corresponds to at least one of:
   a mark panel display;
   a thumbnail display;
   a menu display;
   a program guide display; and
   a program-specific information display corresponding to the audio/video information.

9. A computer readable memory device, memory storage device, including machine readable instructions for implementing the adding and the presenting of claim 1.

10. The method according to claim 7, wherein the displaying involves presenting multiple visual indicators of multiple respective marks at multiple respective display positions along the timeline, where the multiple positions convey respective junctures at which the multiple marks occur within the audio/video information.

11. The method according to claim 7, further comprising:
   receiving an indication of a user-submitted presentation command; and
   in response to the user-submitted presentation command, invoking a currently selected visual indicator.

12. The method according to claim 10, further comprising navigating among the multiple visual indicators to select any one of the multiple visual indicators.

13. The method according to claim 12, wherein the navigating comprises:
   receiving an indication of a first user-submitted navigation command;
   in response to the first user-submitted navigation command, selecting a temporally succeeding visual indicator with respect to a currently selected visual indicator;
   receiving an indication of a second user-submitted navigation command; and
   in response to the second user-submitted navigation command, selecting a temporally prior visual indicator with respect to the currently selected visual indicator.

14. A method for presenting audio/video information, comprising:
   receiving instructions generated in response to activation of a marking mechanism during display of a first program, the activation responsive to operation of a mark button on a remote control;
   displaying a mark panel display in response to the instructions, the mark panel display comprising a thumbnail image of a frame of the first program, the frame taken from the first program at a point in time that the mark was created by operation of the mark button on the remote control;
   adding second and subsequent thumbnail images of frames of second and subsequent programs to the mark panel display, the second and subsequent thumbnail images each resembling a respective picture being displayed by the second and subsequent programs at a point in time that second and subsequent marks are created by second and subsequent operations of the mark button on the remote control;
   displaying, in a larger region, a larger sized version of a thumbnail image selected from among thumbnail images in the mark panel display;
   removing the thumbnail images after a fixed period of time;

displaying an access point to allow access to thumbnail images removed after the fixed period of time; and invoking, by operation of the mark button on the remote control and selection of a displayed thumbnail image, a particular program, associated with the selected displayed thumbnail image, to display the particular program from a point indicated by the displayed thumbnail image.

15. A computer readable medium including machine readable instructions for implementing the method of claim 14.

16. A system comprising:

a first processing mechanism, the first processing mechanism comprising:

a first memory;

a first processor;

presentation logic stored in the first memory and executed by the first processor to present audio/video information;

marking logic, stored in the first memory and executed by the first processor to create a mark associated with audio/video information currently being presented, the mark being embedded in the audio/video information and comprising a visual indicator of the mark at a display position that is related to a time at which the mark is associated with the audio/video information, the marking logic operating in response to user selection of a mark button on a remote control associated with the first processing mechanism ; and a second processing mechanism, physically distinct from the first processing mechanism, the second processing mechanism comprising:

a second memory;

a second processor;

communication logic stored in the second memory and executed by the second processor to receive the audio/video information with the embedded mark;

displaying logic, stored in the second memory, to display a mark panel display, the mark panel display comprising a thumbnail image of a frame of a first program, the frame taken from the first program being displayed at a point in time that the mark was created by operation of the mark button on the remote control;

displaying logic, stored in the second memory, to display in a larger region, a larger sized version of a thumbnail image selected from among thumbnail images in the mark panel display;

removing logic, stored in the second memory, to remove the thumbnail image after a fixed period of time;

access point logic, stored in the second memory, to allow access to thumbnail images removed after the fixed period of time at which the thumbnail images are removed from the mark panel display; and presentation logic stored in the second memory and executed by the second processor to present the audio/video information based on the mark created by the marking logic of the first processing mechanism, the presenting logic operating in response to operation of a mark button on a remote control associated with the second processing mechanism.

17. The method according to claim 1, wherein the mark is stored as a component of the audio/video information.

* * * * *

UNITED STATES PATENT AND TRADEMARK OFFICE
CERTIFICATE OF CORRECTION

| | | |
|---|---|---|
| PATENT NO. | : 7,836,473 B2 | Page 1 of 1 |
| APPLICATION NO. | : 10/779450 | |
| DATED | : November 16, 2010 | |
| INVENTOR(S) | : Tecot et al. | |

It is certified that error appears in the above-identified patent and that said Letters Patent is hereby corrected as shown below:

In column 26, line 14-15, in Claim 9, after "device." delete "memory storage device,".

In column 27, line 5, in Claim 14, delete "program," and insert -- program --, therefor.

In column 27, line 28, in Claim 16, delete "mechanism ;" and insert -- mechanism; --, therefor.

Signed and Sealed this

Fifteenth Day of February, 2011

David J. Kappos
*Director of the United States Patent and Trademark Office*